(12) United States Patent
Rezvanian et al.

(10) Patent No.: US 9,873,159 B2
(45) Date of Patent: Jan. 23, 2018

(54) SYSTEMS AND METHODS FOR MANUFACTURING DIAMOND COATED WIRES

(71) Applicant: SunEdison, Inc., Maryland Heights, MO (US)

(72) Inventors: Omid Rezvanian, Chesterfield, MO (US); Larry Wayne Shive, St. Charles, MO (US); Rituraj Nandan, O'Fallon, MO (US); Dale A. Witte, Wentzville, MO (US); Edward Calvin, Grafton, IL (US)

(73) Assignee: Corner Star Limited, Kowloon (HK)

( * ) Notice: Subject to any disclaimer, the term of this patent is extended or adjusted under 35 U.S.C. 154(b) by 0 days.

(21) Appl. No.: 14/983,954

(22) Filed: Dec. 30, 2015

(65) Prior Publication Data
US 2016/0184909 A1    Jun. 30, 2016

Related U.S. Application Data

(60) Provisional application No. 62/098,039, filed on Dec. 30, 2014.

(51) Int. Cl.
*B28D 1/06* (2006.01)
*B23D 65/00* (2006.01)
*B23D 61/18* (2006.01)
*B28D 5/04* (2006.01)

(52) U.S. Cl.
CPC ........... *B23D 65/00* (2013.01); *B23D 61/185* (2013.01); *B28D 5/045* (2013.01)

(58) Field of Classification Search
CPC ............. B28D 1/06; B28D 1/08; B28D 1/045

USPC .......................... 125/16.02, 21; 451/296, 168
See application file for complete search history.

(56) References Cited

U.S. PATENT DOCUMENTS

| 6,070,570 | A | 6/2000 | Ueoka et al. |
| 6,102,024 | A | 8/2000 | Buljan et al. |
| 9,067,268 | B2 | 6/2015 | Liebelt et al. |
| 2012/0132045 | A1 | 5/2012 | Popa et al. |
| 2014/0017984 | A1 | 1/2014 | Rehrig et al. |

(Continued)

FOREIGN PATENT DOCUMENTS

WO    2016013985 A1    1/2016

*Primary Examiner* — Robert Rose
(74) *Attorney, Agent, or Firm* — Armstrong Teasdale LLP

(57) ABSTRACT

A method for designing a diamond coated wire for use in a wafer slicing system includes adjusting an initial diamond size distribution until an intermediate diamond size distribution is generated, wherein the intermediate diamond size distribution has a corresponding simulated penetration thickness value less than or equal a predetermined penetration thickness value, and wherein penetration thickness is a parameter proportional to a depth of subsurface damage that would occur when slicing an ingot using a diamond coated wire having an associated diamond size distribution. The method may include adjusting the intermediate diamond size distribution until a final diamond size distribution is generated, wherein the final diamond size distribution has a maximum diamond grit size that is substantially equal to a predetermined maximum diamond grit size, and manufacturing the diamond coated wire such that the diamond coated wire has a plurality of diamond grits that fit the final diamond size distribution.

20 Claims, 21 Drawing Sheets

(56) References Cited

U.S. PATENT DOCUMENTS

2014/0150766 A1\* 6/2014 Che ................... B24B 27/0633
  125/16.02
2015/0144120 A1   5/2015 Campos et al.
2015/0314484 A1\* 11/2015 Pietsch ............. B23D 57/0023
  125/21

\* cited by examiner

SYSTEMS AND METHODS FOR MANUFACTURING DIAMOND COATED WIRES

CROSS-REFERENCE TO RELATED APPLICATIONS

This application claims the benefit of U.S. Provisional Patent Application No. 62/098,039 filed Dec. 30, 2014, the entire disclosure of which is hereby incorporated by reference.

FIELD

This disclosure generally relates to slicing semiconductor or ceramic material into wafers, and more specifically, to designing diamond particle distributions and wires for use in slicing such material.

BACKGROUND

In some wafer slicing processes, by using diamond coated wire (DCW), damage may be induced on the surface and/or subsurface of the wafers. Common types of damage include cracks and dislocations. An ideal DCW slicing process produces wafers with relatively shallow subsurface damage while consuming relatively little wire. The desire to minimize depth of subsurface damage and the desire to minimize wire consumption are typically competing concerns in DCW systems when determining a size of diamond grits with which the wire is coated. Specifically, smaller diamond grits generally reduce depth of subsurface damage, while larger diameter grits generally reduce wire consumption.

At least some known systems have been developed based on wear and indentation studies that consider the effects of a single hard indenter on a softer material. The parameters considered in these studies include an indenter's shape, a sharpness, a relative hardness, an applied force, and a material removal rate and/or depth of damage beneath the indenter. If the indenter is sliding relative to the surface, the parameters may also include sliding distance and velocity.

However, developing systems based on these studies fails to take into account situations in which a plurality of indenters of different sizes are involved, and in which material removal rates and depth of damage requirements are different at different locations. In such situations, the material removal rate and depth of subsurface damage are determined by the collective action of the plurality of indenters.

This Background section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF SUMMARY

In one aspect, a method for designing a diamond coated wire for use in a wafer slicing system is provided. The method includes adjusting an initial diamond size distribution until an intermediate diamond size distribution is generated, wherein the intermediate diamond size distribution has a corresponding simulated penetration thickness value less than or equal a predetermined penetration thickness value, and wherein penetration thickness is a parameter proportional to a depth of subsurface damage that would occur when slicing an ingot using a diamond coated wire having an associated diamond size distribution. The method further includes adjusting the intermediate diamond size distribution until a final diamond size distribution is generated, wherein the final diamond size distribution has a maximum diamond grit size that is substantially equal to a predetermined maximum diamond grit size, and manufacturing the diamond coated wire such that the diamond coated wire has a plurality of diamond grits that fit the final diamond size distribution.

In another aspect, a diamond coated wire for use in a wafer slicing system is provided. The diamond coated wire includes a plurality of diamond grits fitting a predetermined diamond size distribution, wherein the predetermined diamond size distribution has a simulated penetration thickness value less than or equal to approximately 5 microns, wherein penetration thickness is a parameter proportional to a depth of subsurface damage that would occur when slicing an ingot using the diamond coated wire, and wherein the predetermined diamond size distribution has a maximum diamond grit size between approximately 20 microns and 23 microns.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION OF THE DRAWINGS

Like reference symbols in the various drawings indicate like elements.

DETAILED DESCRIPTION

Figure 1:
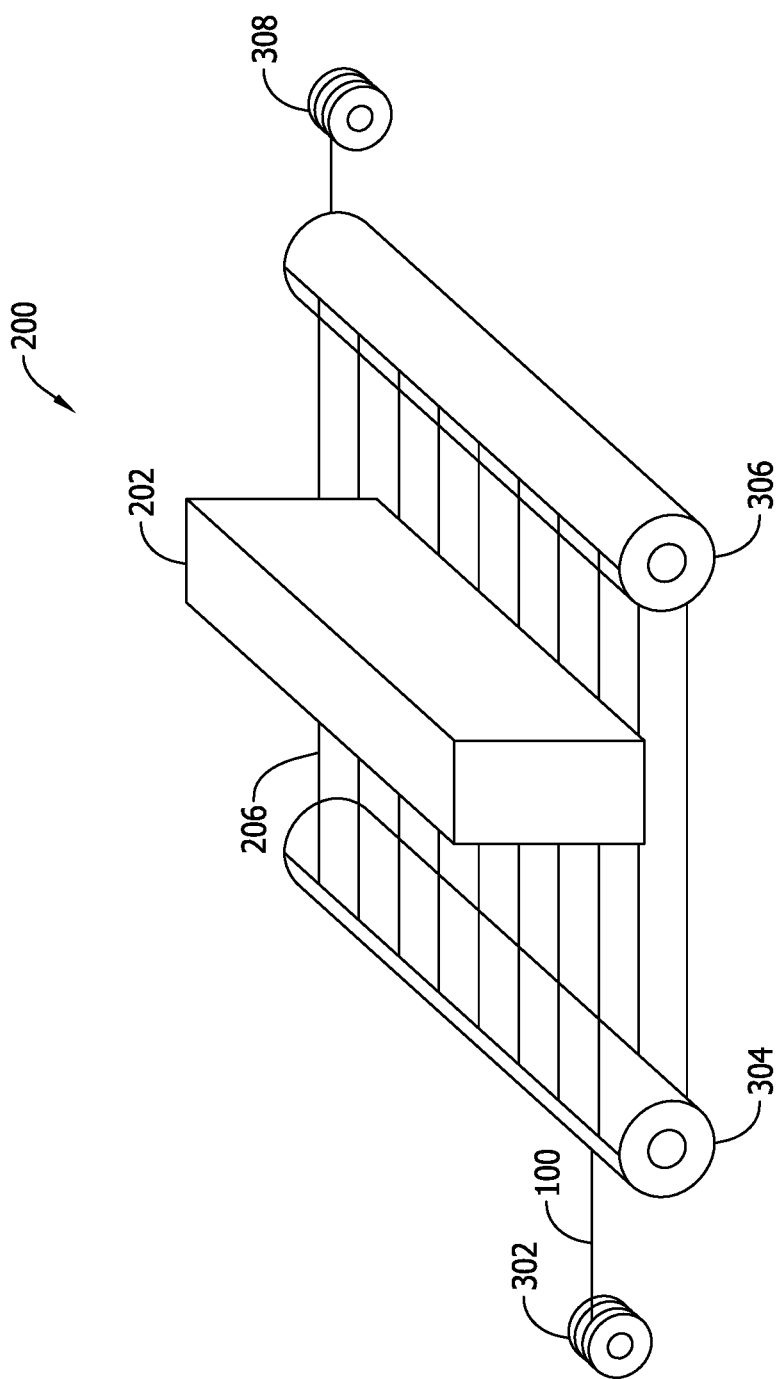
FIG. 1 is a diagram of an example wire saw wafer-slicing system using a diamond coated wire.
Figure 2:
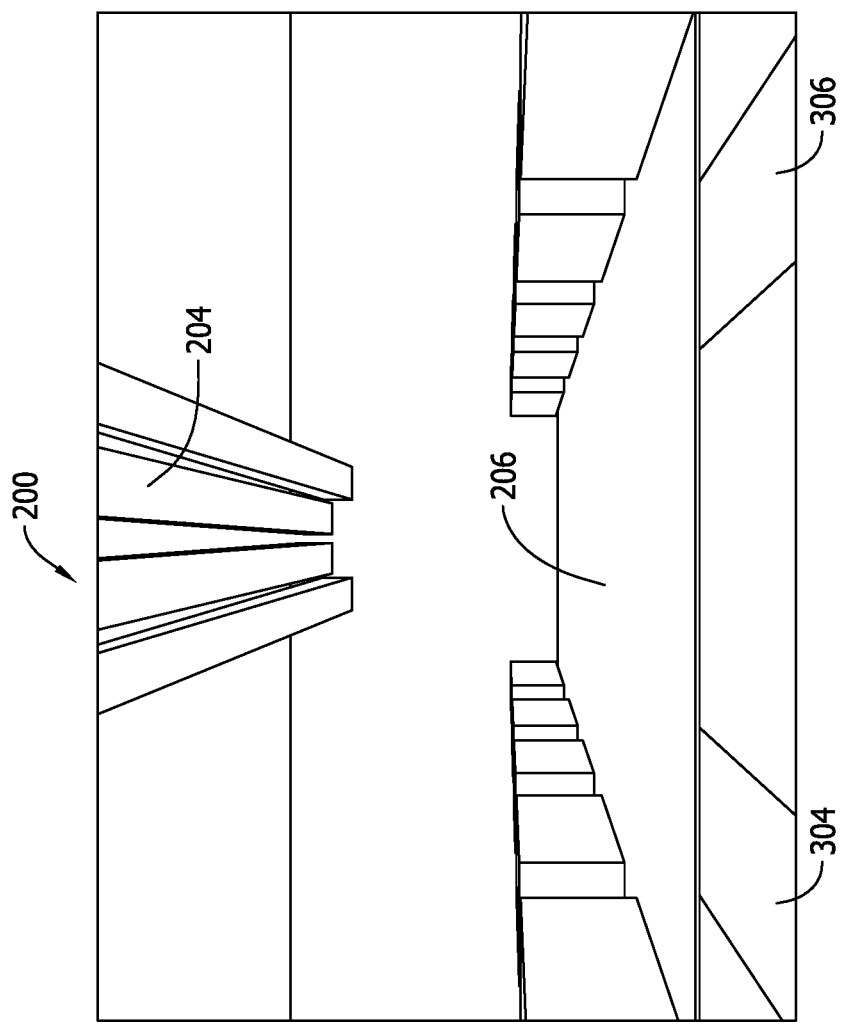
FIG. 2 is a photograph of the wire saw wafer-slicing system shown in FIG. 1.

Referring initially to FIGS. 1 and 2, wire saws with diamond coated wire, such as diamond coated wire 100, may be used in a wafer slicing system, such wire saw 200. In saw 200, an ingot 202 is attached to a beam 204 for wire saw 200. Ingot 202 may have a square, semi-square, or semi-circular cross section. As shown in FIG. 2, wire 100 forms a wire web 206.

Wire web 206 is formed by feeding wire 100 from a feed spool 302 into saw 200, winding wire 100 around two wire guide rollers 304, 306, then sending wire 100 to a take-up spool 308. With wire web 206 in place, beam 204 (shown in FIG. 3) is vertically lowered onto wire web 206. The speed of beam 204 as it is lowered on wire web 206 is a table speed, $V_t$. Table speed $V_t$ may vary during the slicing process. At the same time beam 204 is lowering ingot 202 onto wire web 206, separate motors (not shown) apply torque to wire guide rollers 304, 306, causing wire guide rollers 304, 306 to spin. The spinning of wire guide rollers 304, 306 causes wire 100 of wire web 206 to move. The speed with which wire 100 of wire web 206 travels is a wire speed, $V_w$. As beam 204 is lowered, ingot 202 comes into contact with wire web 206, and material from ingot 202 is abrasively removed by hard diamond grits. This enables wire 100 of wire web 206 to cut through ingot 202 and slice ingot 202 into wafers. A coolant (not shown) is applied to wire 100 and/or to the slicing interface between wire 100 and ingot 202. The coolant cools wire 100 and the cutting interface. It also lubricates the cut and carries away debris created during cutting.

Figure 3:
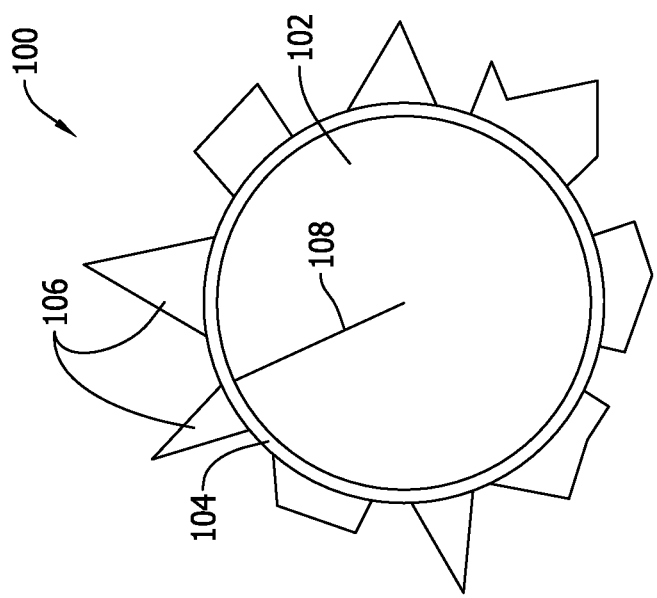
FIG. 3 is a cross-sectional view of an example diamond coated wire that may be used with the wafer-slicing system shown in FIG. 1.

Referring now to FIG. 3, diamond coated wire (DCW) 100 includes a core 102, a coating or cladding layer 104, and diamond grits 106. Core 102 is made of a ductile material with high tensile strength, such as, for example, a steel alloy. Core 102 may alternatively be made of any other suitable material. The core diameter may be in a range from approximately a few tens of microns to a few hundreds of microns.

Coating layer 104 acts as a binding medium between diamond grits 106 and core 102. Coating layer 104 also protects core 102 from oxidation. Coating layer 104 may be made of a metal or a resin. The coating thickness may be in a range from approximately a few microns up to tens of microns depending on the size of diamond grits 106 and a core diameter 108.

Diamond grits 106 may have different sizes. The size of diamond grits 106 in a batch, which are used to cover a certain length of wire 100, may be represented by a statistical distribution measure such as a probability density function. The size of diamond grits 106 may range from approximately one micron to many tens of microns. Other characteristics to consider for diamond grits 106 are the shape, the sharpness, the friability, and the purity. The number of diamond grits 106 on a straight line on a given length of wire 100 is represented by a linear concentration of diamond grits 106.

Figure 4:
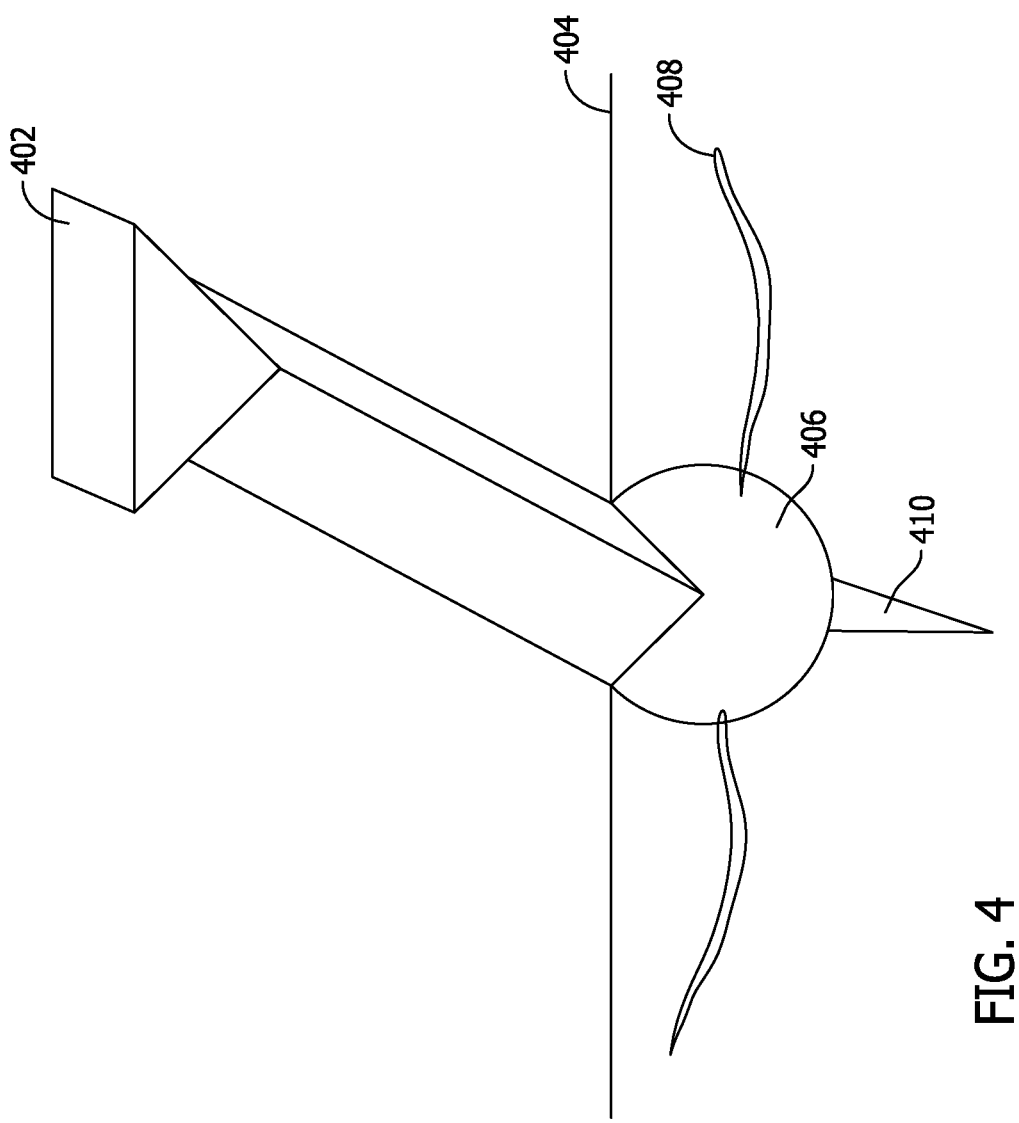
FIG. 4 is a diagram illustrating types of subsurface damage in wafer slicing systems.

FIG. 4 illustrates types of abrasive wear common in DCW saws (e.g., saw 100). The primary modes of wear or material removal mechanisms include adhesive wear, abrasive wear, fatigue, erosion and corrosion. Among these, abrasive wear occurs where a hard surface or hard particles slide on a softer surface. If the softer material is ductile with a high fracture toughness, material removal occurs primarily by plastic flow. If the material is brittle with low fracture toughness, material removal occurs primarily by brittle fracture.

When a sharp indenter 402, such as a sharp diamond grit (e.g., diamond grit 106), scratches a surface 404 of a brittle material, a plastic deformation zone 406 develops beneath indenter 402. Two different types of cracks (i.e., subsurface damage) may initiate and propagate from plastic deformation zone 406: lateral cracks 408 and median cracks 410. Lateral cracks 408 propagate laterally and toward surface 404. The material in between lateral cracks 408 and surface 404 is separated from the material bulk and removed as platelets. Therefore, lateral cracks 408 contribute to cutting action and material removal. Median cracks 410, on the other hand, propagate away from surface 404, into the bulk of the object, resulting in undesirable subsurface damage.

Figure 5:
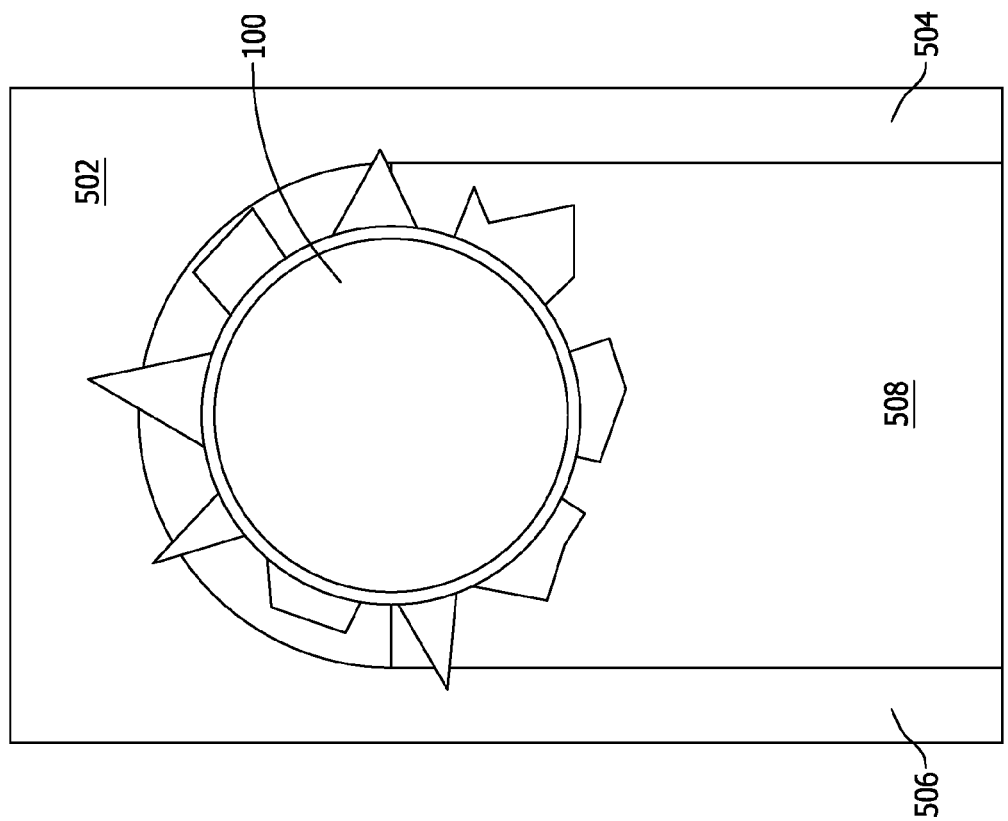
FIG. 5 is a simplified diagram illustrating the diamond coated wire of FIG. 3 cutting an ingot.

Referring now to FIG. 5, during the slicing process, a material 502 of the ingot (e.g., ingot 202) above the wires (e.g., wire 100) turns into kerf. The material in between wires 100 forms wafers 504 or 506. The space between wafers 504, 506, from which material 502 has been removed, is referred to as a cut channel 508.

Figure 6:
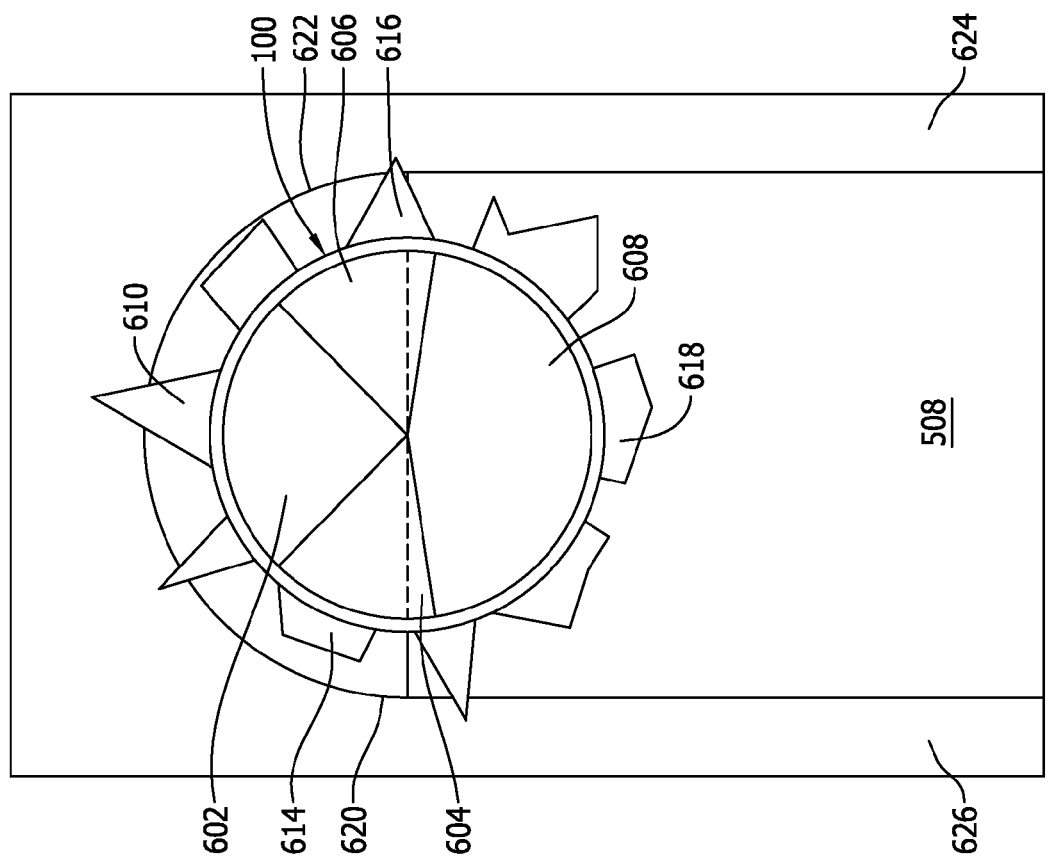
FIG. 6 is the simplified diagram of the diamond coated wire of FIG. 3 with geometric indications to illustrate different regions of the wire.

Referring now to FIG. 6, one important attribute of wafer quality is the depth of subsurface damage induced by brittle fracture mechanisms (shown in FIG. 4) associated with abrasive material removal by diamond grits (e.g., diamond grits 106), herein referred to as the "depth of damage". During the wafer slicing process, four segments are distinguished on the periphery of wire 100, relative to cut channel 508: a top segment 602, a left segment 604, a right segment 606, and a bottom segment 608.

Diamonds 612 on top segment 602 are responsible for a majority of the material removal. Most studies on abrasive material removal in brittle materials focus on the cutting action in this zone, and involve developing relations between force per grit, stress fields, indentation depth, elastic and plastic deformations, and length of different types of cracks.

Diamonds 614, 616 on left and right segments 604, 606, respectively, perform some material removal on lateral faces 620, 622 of cut channel 508, which eventually form the surface of wafers 624, 626. These are the "cutting zones" that determine a quality of wafers 624, 626, in terms of depth of subsurface damage. Diamonds 618 on bottom segment 608 do not contribute to the cutting action, which emphasizes that material removal by diamond grits 614, 616 on left and right segments 604, 606 is the factor that actually determines surface and subsurface characteristics of wafers 624, 626.

Figure 7:
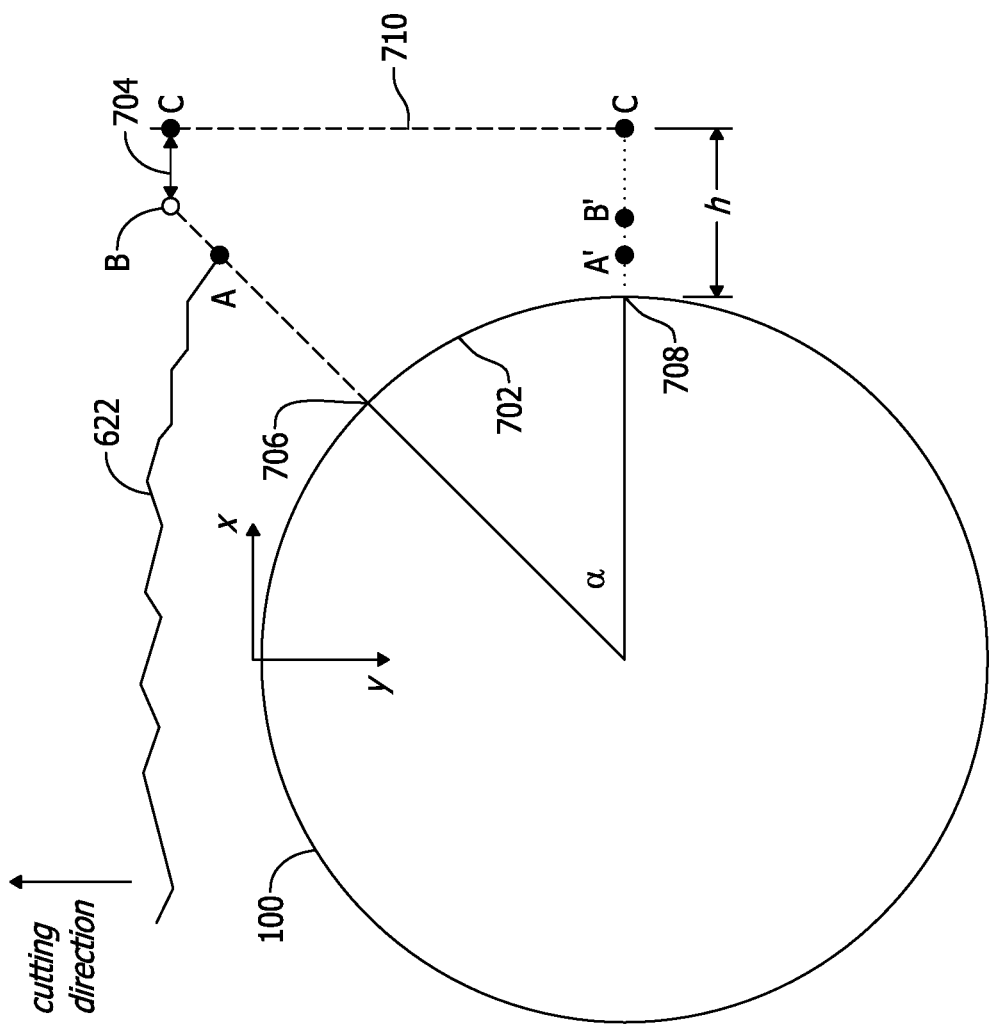
FIG. 7 is a diagram of a diamond coated wire of the system of FIGS. 1 and 2.

FIG. 7 is a diagram of wire 100 that illustrates the concept of the methods described herein for establishing a relation between depth of subsurface cracks and a size range and distribution of diamond grits (e.g., diamond grits 106). The depth of damage at any location on a wafer is a function of the depth of the groove (e.g., plastic deformation zone 406, shown in FIG. 4) that a diamond grit creates on the surface of the wafer as wire 100 moves along the surface. The depth of the deformation zone may also be referred to as the "indentation depth", "penetration depth", or the thickness that the diamond grit cuts through in the material of the ingot. The more diamond grits are forced into the material, the deeper the deformation zone becomes, and the deeper the resulting subsurface damage will be.

Diamonds (not shown in FIG. 7) are located on a segment 702 of the periphery of wire 100 at a central angle α. As wire 100 cuts through the ingot (e.g., ingot 202 shown in FIG. 1), the diamonds will cut through ingot 202. A distance 704 between a tip of a diamond grit located on segment 702 and the wafer's eventual surface 710, shown by point C, provides a buffer against subsurface damage and is herein referred to as a "buffer depth". The tip of a diamond grit located at a top 706 of segment 702 is farther away from wafer surface 710, compared to the tip of the same diamond grit when located at a bottom 708 of segment 702. A diamond grit of size h located at bottom 708 of segment 702 will have a no buffer depth. In other words, the diamond grit will induce longer subsurface cracks into wafer surface 710 when located at bottom 708. Bottom 708 of segment 702 is herein also referred to as the "bottom point" or "bottom location". The penetration depth into the ingot surface of the longest of the diamond grits at bottom point 708 is herein referred to as the "penetration thickness." That is, the "penetration thickness" is the thickness of ingot material that a diamond grit oriented substantially orthogonal to wafer surface 710 must cut through. Penetration thickness is proportional to the depth of subsurface damage.

For example, take an axial (into the plane) location of segment 702 to be fixed at the entry point of a cut channel. That is, wire location is fixed. For example, take point A on the surface of the ingot. The ingot moves downward (i.e., the cutting direction is upward, as shown in FIG. 7). If there are no diamond grits along segment 702, the ingot will not be cut further as it moves downward. Therefore, point A on the cut surface of the ingot will translate vertically to point A' as the ingot moves downward. There is a final diamond grit of size h located at bottom 708 of segment 702. This final diamond grit will have to cut through a penetration thickness equal to the distance from point A' to point C.

Now take a second example, and again consider point A on the cut surface of the ingot. The ingot is moving downward. In this example, a diamond grit exists on the surface of wire 100 at top 706 of segment 702. This diamond grit cuts the ingot back to point B. As before, if there are no more diamond grits along segment 702, the ingot will not be cut further as it moves downward. Therefore, point B on the cut surface of the ingot will translate vertically to point B' as the ingot moves downward. The final diamond grit of size h from the previous example exists at bottom 708 of segment 702. In this example, however, the final diamond grit only has to cut through a penetration thickness equal to the distance from point B' to point C.

This smaller penetration thickness, in the second example, induces smaller subsurface cracks, and therefore a smaller depth of subsurface damage. In other words, the penetration thickness depends on cutting into the ingot multiple times before the ingot reaches the bottom point. From a different perspective, in order to reduce the depth of damage, there is a window of opportunity from the time a point on the ingot reaches top 706 of segment 702 to remove material before the point on the ingot reaches bottom location 708.

Figure 8:
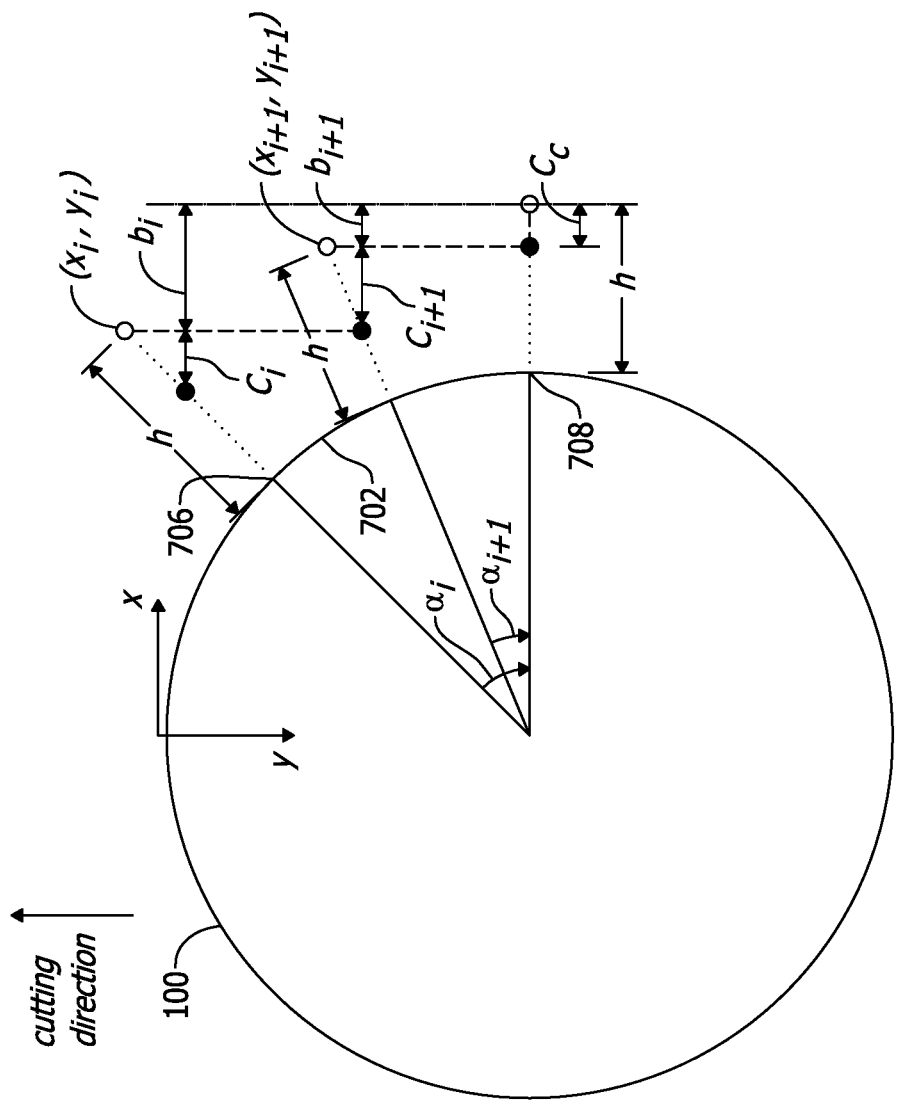
FIG. 8 is a diagram of a diamond coated wire of the system of FIGS. 1 and 2.

FIG. 8 expands on the example of FIG. 7, in which a point on an ingot undergoes N number of cuts by N diamond grits of the same size h, as the ingot travels down from top 706 of segment 702 to bottom location 708. At an ith cut, a point is defined by its x- and y-coordinates $x_i$ and $y_i$. The method disclosed herein uses geometrical relations to obtain x- and y-coordinates of an estimated path that any point on the ingot takes as the ingot moves toward bottom location 708.

An indentation depth $C_{i+1}$ is governed by the equation $$C_{i+1}=(r+h)(\cos(\alpha_{i+1})-\cos(\alpha_i)),$$

and a buffer depth $b_{i+1}$ is governed by $$b_{i+1}=(r+h)(1-\cos(\alpha_{i+1})).$$

Figure 9:
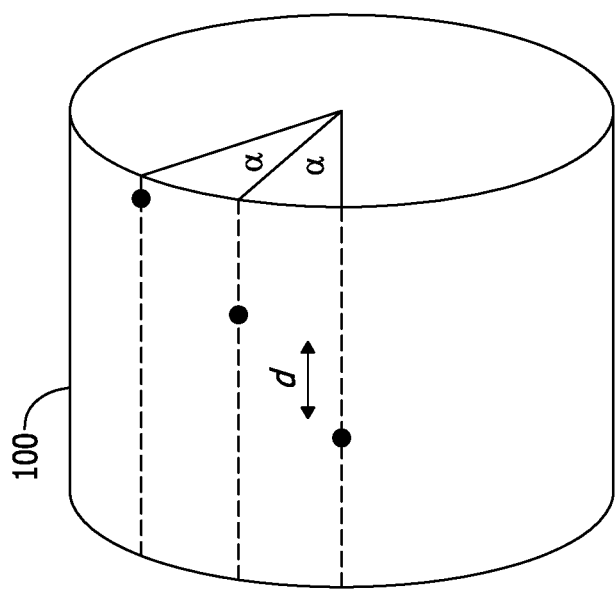
FIG. 9 is a perspective view of a diamond coated wire of the system of FIGS. 1 and 2.

A density of diamond grits is defined using two components: axial concentration and angular concentration. FIG. 9 shows a perspective view of an example DCW 100. At a given angular position, the axial concentration is the number of diamond grits over a certain length d along the axis of wire 100. Over a certain length of wire 100, angular concentration is defined as the number of diamond grits at different angular positions, indicated by their central angles α.

The examples above assume all diamond grits have the same size (size h in the examples above). In order to take the size distribution of the diamond grits into account, a 'Monte Carlo' method is used, in which the input variables are the sizes of the diamond grits, and the output is the penetration thickness. The steps taken in this 'Monte Carlo' method are the following:

(i) The number of input variables (number of potential cuts) is determined based on the axial and angular concentrations of the diamond grits, the table speed, and the wire speed.
(ii) The probability distribution of size of diamond grits is used to generate random values for the input variables.
(iii) Geometrical relations and x- and y-coordinates of an estimated path for a point on the ingot are deterministically computed.
(iv) The penetration thickness, which is the output, is then computed based on the x- and y-coordinates of the ingot at the bottom location and the size of the largest diamond.

In some embodiments, table speed may be in a range from approximately 0.1 millimeters per minute (mm/min) to 2 mm/mi or higher, and wire speed may be in a range from approximately 10 meters per second (m/s) to 25 m/s. However, these values are merely examples, and the systems and methods described herein may be implemented using any suitable table speed and/or wire speed.

Figure 10:
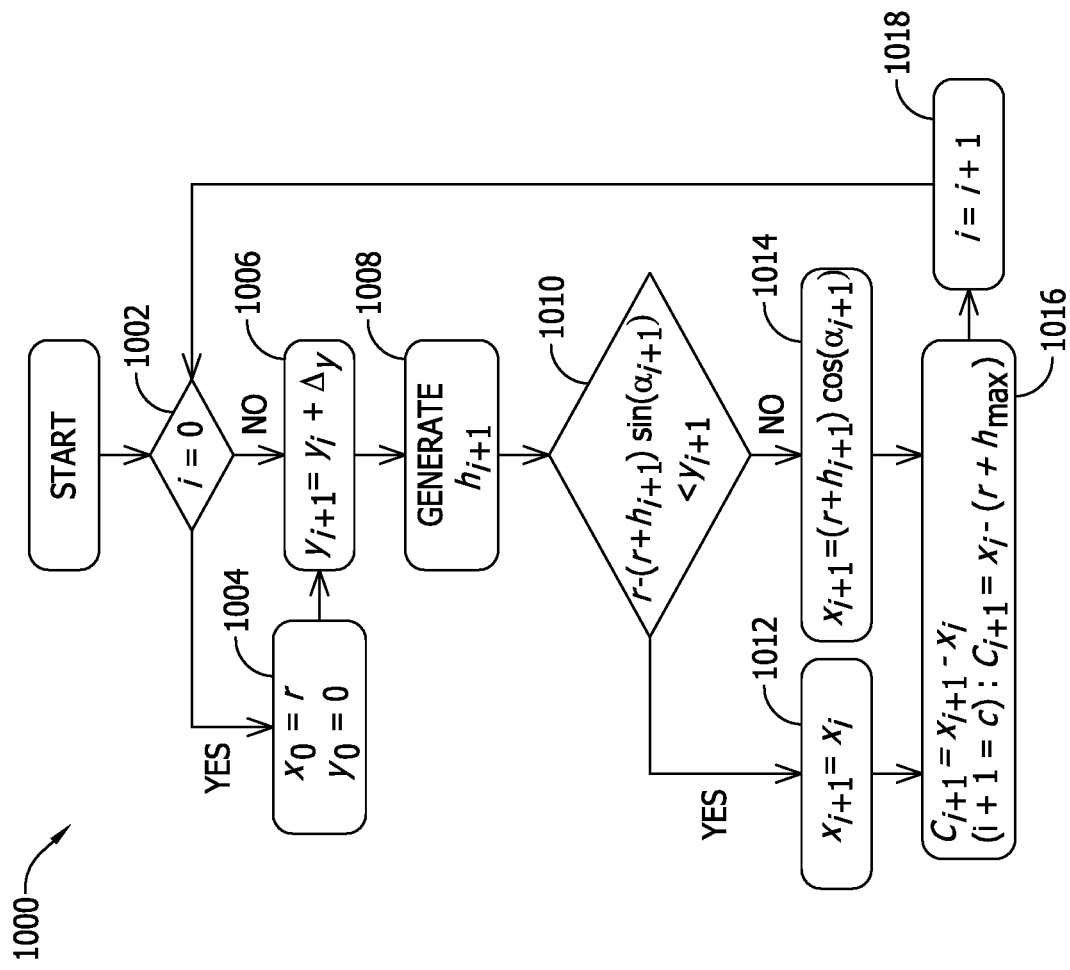
FIG. 10 is a flow chart illustrating an example method for manufacturing diamond coated wires.

FIG. 10 is a flow chart 1000 illustrating one run of the described steps. At step 1002, the model determines if the system is at its first iterative cut—i.e., if a point of interest on an ingot is at top 706 of segment 702. If i=0, then at step 1004, the first x-coordinate, $x_0$, is set to r, the radius of the wire. Further, the first y-coordinate, $y_0$, is set to 0. Then the flow proceeds to step 1006.

If, at step 1002, i≠0, then the flow proceeds to step 1006, bypassing step 1004. At step 1006, the model assumes the point of interest on the ingot moves through the first cut, i.e., the y-coordinate moves downwards (in the +y direction) by an interval of Δy.

At step 1008, the model generates a height $h_{i+1}$ of a diamond grit at the next point on the wire along the segment (e.g., segment 702).

At step 1010, the model determines a new y-coordinate of the point of interest after being cut by a diamond of the size generated in step 1008. If the y-coordinate calculated (by assuming a cut from a diamond of the size generated at step 1008) is less than the y-coordinate predicted at step 1008, the diamond was too small to make an actual cut in the ingot, i.e., no change has been made, and the ingot has not been cut. Further, the flow proceeds to step 1012, and it is indicated that there is no change in the x-coordinate either.

If, at step 1010, the y-coordinate calculated (by assuming a cut from a diamond of the size generated at step 1008) is not less than the y-coordinate predicted at step 1008, the flow proceeds to step 1014. The next x-coordinate is set based on the geometric characteristics of the cut based on the size of the diamond (as generated at step 1008).

At step 1016, $c_{i+1}$ (shown in FIG. 8, defined as a change in the x-coordinate of the point of interest on the ingot or, in other words, the amount of ingot cut away by the diamond) is computed. If this is the last iteration (i.e., i+1=c), $c_{i+1}$ is the penetration thickness $C_c$. If this is not the last iteration, at step 1018, the index variable is incremented and the flow returns to step 1002.

Iteratively performing these steps constitutes a single run. Each single run, when complete (i.e., iteratively running through the flow chart of FIG. 10 until i+1=c) generates one data point for the penetration thickness. After n runs, there will be n data points generated for the result, which are used to determine a probability distribution of the penetration thickness. A required number of runs, n, may be determined using a convergence analysis. This method of modeling the DCW enables the use of size distribution and concentration of the diamond grits to compute a probability distribution for the penetration thickness, which is a measure of depth of subsurface damage.

EXAMPLE 1

Assume a Normal (Gaussian) distribution for the size of diamond grits with a minimum size of 10 μm, a maximum size of 20 μm, a mean size of 15 μm, and a standard deviation of approximately 1 μm. Also, assume a wire core radius, r, is 50 μm, the table speed, $V_t$, is 13.3 μm/s, and the wire speed, $V_w$, is 18 m/s.

For the given wire speed and table speed, for each meter that the wire travels, the ingot will move down approximately Δy=0.74 μm.

$$\Delta y(\mu m) = \frac{r}{\left(\frac{r}{V_T}\right)V_W} = \frac{V_T(\mu m)}{V_W}.$$

If the diamond concentration is such that at each Δy step there is only one diamond that can potentially make a cut on the ingot, then for the given r and for Δy equal to 0.74 μm, there exist up to 67 cuts (50 μm/0.74 μm) that can potentially cut the ingot back before it reaches the bottom location. Therefore, the number of input variables, N, is equal to 67. Random diamond sizes are generated from the given size distribution.

Figure 11:
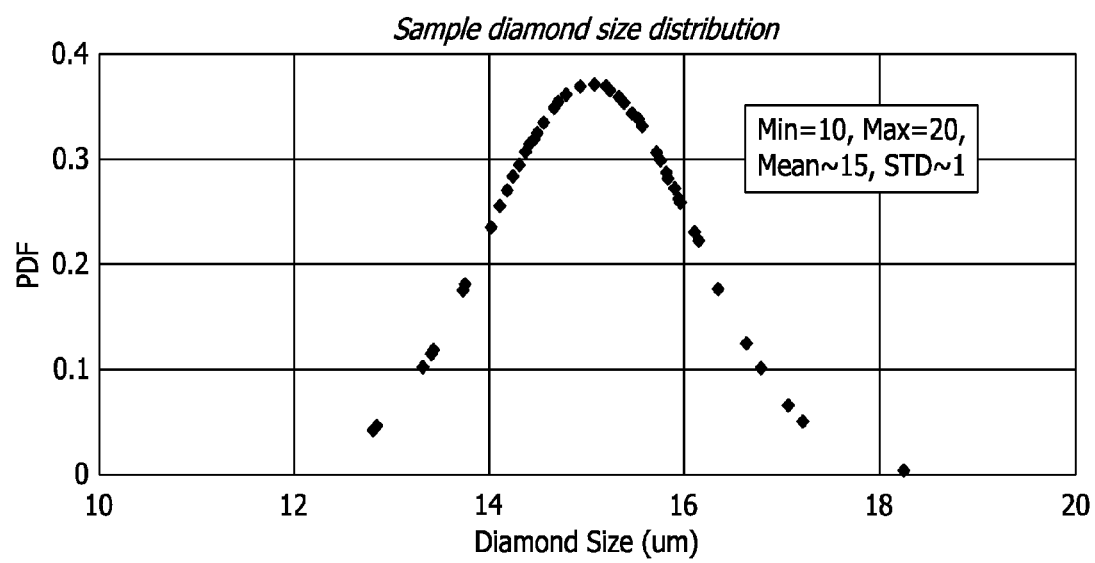
FIG. 11 is a plot of an example diamond grit size distribution.

FIG. 11 shows a sample size distribution generated for 67 diamonds. The penetration thickness ($C_c$) is then computed for this size distribution using the flow chart shown in FIG. 11. The result gives one data point for the penetration thickness. In this example, the computation is repeated 500 times, in order to obtain 500 data points for the penetration thickness.

Figure 12:
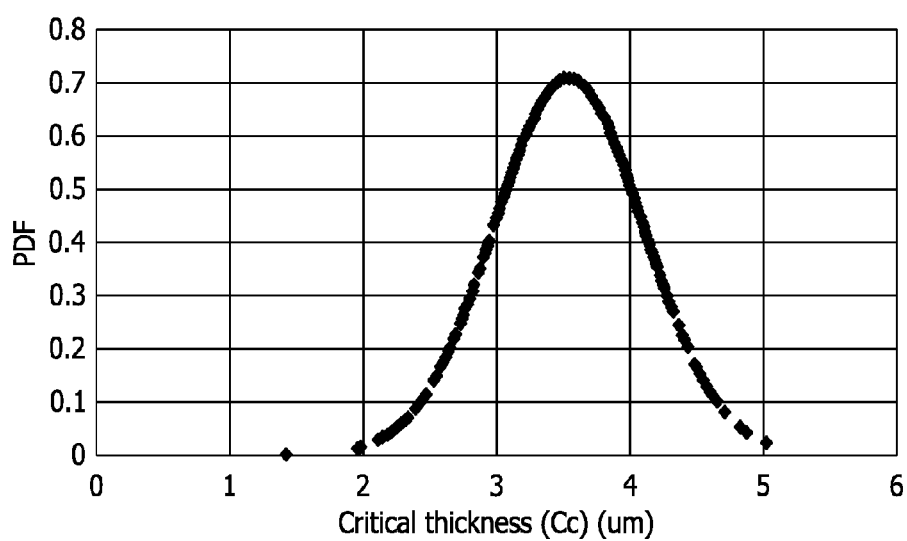
FIG. 12 is a plot of an example probability density function of penetration thickness for the size distribution of FIG. 11.

FIG. 12 shows a probability density function for the penetration thickness based on 500 data points. For the given parameters, size distribution, and concentration, a maximum penetration thickness of approximately 5 μm results, with an average penetration thickness of approximately 3.6 μm.

Optimizing the Size Range of Diamond Grits

The methods and systems described herein may be used to model and compare any number of different scenarios in order to facilitate determining optimal wires for a system with given parameters (e.g., a maximum penetration thickness and a maximum diamond size). In particular, the methods described herein may be used to determine an improved diamond grit size range that takes into account given manufacturing parameters.

EXAMPLE 2

Figure 13:
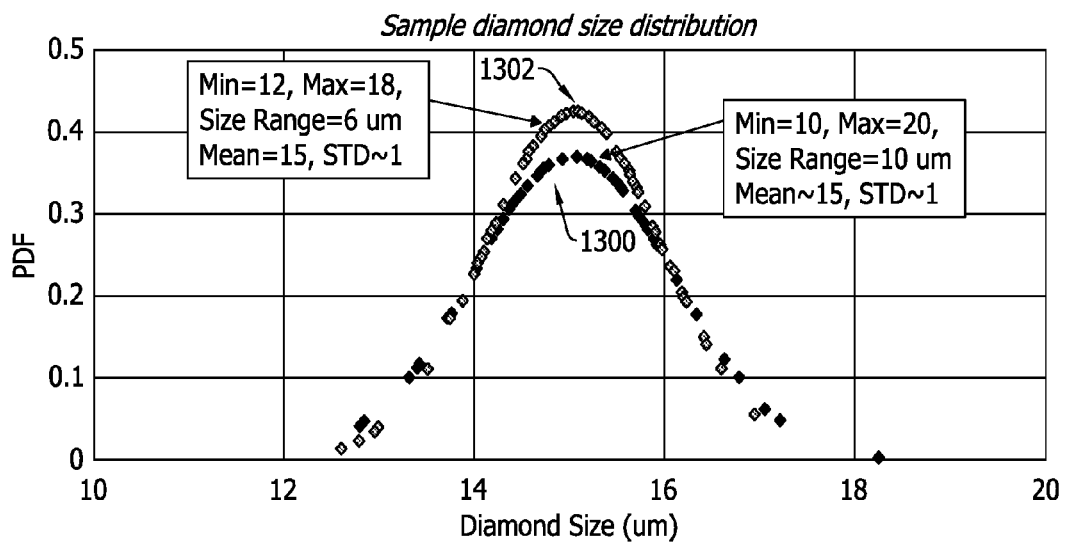
FIG. 13 is a plot of two example diamond grit size distributions with different size ranges.

FIG. 13 shows two diamond size distributions for two wires, which only differ in size range of diamond grits. A first wire 1300 has diamond grits with a size range of approximately 10 μm, from a minimum size of approximately 10 μm to a maximum size of approximately 20 μm; a mean size of approximately 15 μm; and a standard deviation of approximately 1 μm. A second wire 1302 has diamond grits with a size range of approximately 6 μm, from a minimum size of approximately 12 μm to a maximum size of approximately 18 μm; a mean size of approximately 15 μm; and a standard deviation of approximately 1 μm. The two distributions have the same average (15 μm) and standard deviation (1 μm).

Also given are a wire core radius, r, of 50 μm; a table speed, $V_t$, of 13.3 μm/s; and a wire speed, $V_w$, of 18 m/s. For the given wire speed and table speed, for each meter that the wire travels, an ingot will move down approximately Δy=0.74 μm.

If the diamond concentration for both wires 1300, 1302 is such that at each Δy step, there is only one diamond that can potentially cut the ingot, then for the given r and for Δy equal to 0.74 μm, there exist up to 67 cuts (50 μm/0.74 μm) that can potentially cut the ingot back before the ingot reaches the bottom location. Therefore, the number of input variables, N, is equal to 67. The penetration thickness ($C_c$) is computed for each of first 1300 and second wire 1302. The computations are repeated 500 times for each of first wire 1300 and second wire 1302.

Figure 14:
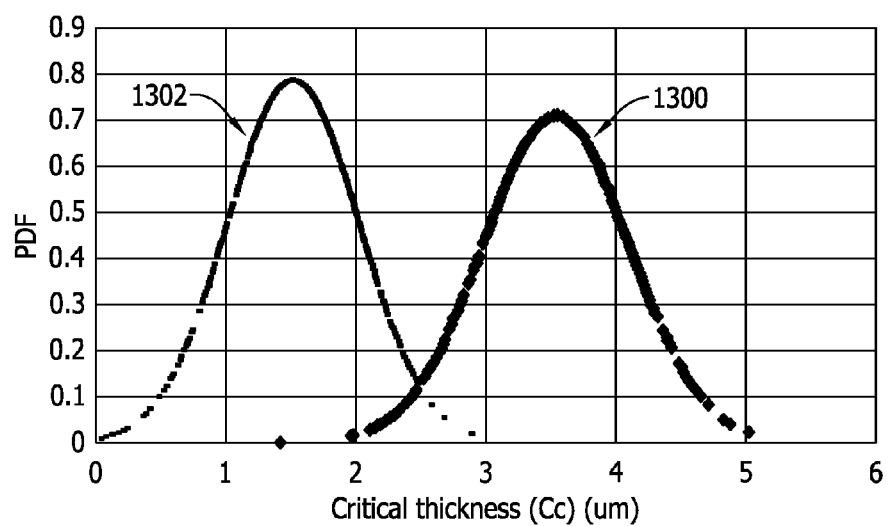
FIG. 14 is a plot of the probability density functions of penetration thickness for the size distributions of FIG. 13.

FIG. 14 shows probability density functions for the penetration thickness variables that are computed based on the 500 data points for each of first wire 1300 and second wire 1302. For first wire 1300 (with diamond size range of approximately 10 μm), the maximum penetration thickness is approximately 5 μm, with an average penetration thickness of approximately 3.6 μm. For wire 1302 (with diamond size range of approximately 6 μm), the maximum penetration thickness is approximately 3 μm, with an average penetration thickness of approximately 1.5 μm. The maximum penetration thickness, which is a measure of depth of subsurface damage, is 2 μm smaller for wire 1302. A wire with a smaller size range of diamond grits thus induces a smaller maximum penetration thickness than a wire having diamond grits with the same average size but with a greater range of diamond grit sizes.

Figure 15:
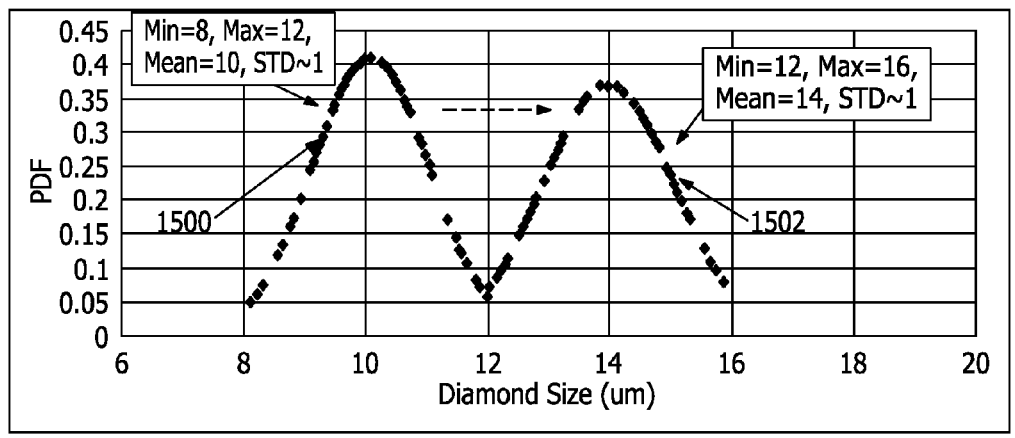
FIG. 15 is a plot of two example diamond grit size distributions with the same size range and different mean size.

FIG. 15 shows a diamond size distribution for two wires, a first wire 1500 and a second wire 1502. First wire 1500 has diamond grits with a size range of approximately 4 μm, from a minimum size of approximately 8 μm to a maximum size of approximately 12 μm; a mean size of approximately 10 μm; and a standard deviation of approximately 1 μm. Second wire 1502 has diamond grits with the same size range as wire 1500, 4 μm, but the size range for wire 1502 ranges from a minimum size of approximately 12 μm to a maximum size of approximately 16 μm; a mean size of approximately 14 μm; and a standard deviation of approximately 1 μm. The diamond size distributions (ranges) for wire 1500 and wire 1502 have the same shape, and the size distributions only differ in that the distribution of wire 1502 is shifted along the size axis from the distribution of wire 1500. For the same diamond concentration, wire speed, table speed, and number of iterations as above (for FIGS. 13 and 14), the same method may be used to determine the distribution of the penetration thicknesses.

Figure 16:
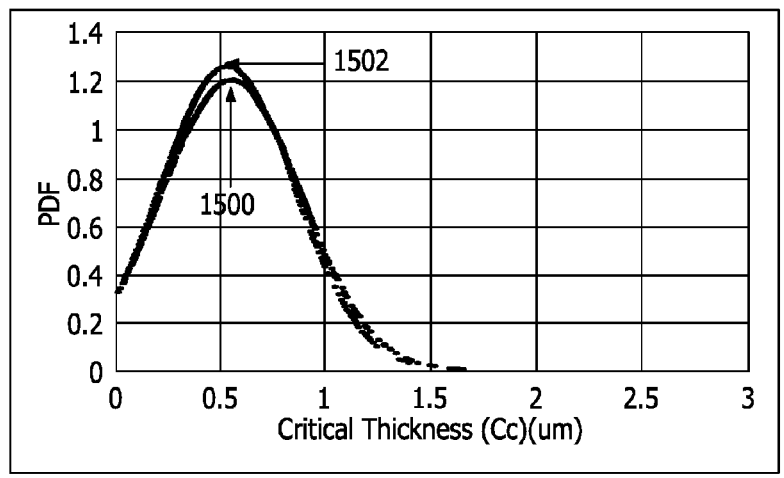
FIG. 16 is a plot of the probability density functions of penetration thickness for the size distributions of FIG. 15.

FIG. 16 shows a probability distribution function (PDF) of penetration thickness for each of first wire 1500 and second wire 1502. The two PDFs only differ very slightly. It is apparent that a shift of diamond size distribution along the size axis has almost no effect on penetration thickness PDF and, therefore, has almost no effect on the depth of subsurface cracks.

In other words, the mean size of the diamond grits has much less of an effect on the depth of subsurface damage than does the size range of the diamond grits. Thus, a wire may be designed to have larger diamond grits while maintaining a predetermined maximum penetration thickness. The larger diamond grit size enables increased material removal rate in the top segment of a cutting zone (i.e., top segment 602, shown in FIG. 6). As described above, choosing larger diamond grits reduces required wire usage. Moreover, choosing a particular size range enables maintenance of the required penetration thickness (depth of subsurface damage) in the left and right segments (i.e., left and right segments 604, 606, shown in FIG. 6). As described above, reducing penetration thickness improves wafer quality. In other words, increasing the mean size of diamond grits on a wire while maintaining a reduced size range of the diamond grits enables the coordination of two competing concerns of DCW manufacturing—wire usage and wafer quality.

EXAMPLE 3

Example 3 illustrates designing and manufacturing DCWs by adjusting diamond size range. More specifically, in practice, the method for determining an improved diamond grit size range may include the following steps:

(i) The requirements for depth of subsurface cracks are defined. The requirements may include, for example, a maximum allowed subsurface crack depth, a maximum average subsurface crack depth, or some other measure.

(ii) The corresponding maximum allowable penetration thickness values are calculated.

(iii) A requirement for material removal is defined, which sets a maximum size of diamond grits. The maximum diamond grits size may also be defined by the concentration of diamond grit, such that the diamond grits do not stack up on each other on the wire.

(iv) For a given diamond size distribution over a given size range, the size range is incrementally adjusted by varying the minimum and maximum size limits. At each increment, the penetration thickness is computed (as described with respect to FIGS. 11-16 and Examples 1 and 2). The computed penetration thickness is compared with the target penetration thickness, determined in (ii). The incremental adjustment of the size range continues until the target penetration thickness is reached.

(v) Once the target size range is determined in (iv), the size distribution is shifted to the defined maximum diamond grit size, based on the criteria defined in (iii).

Figure 17:
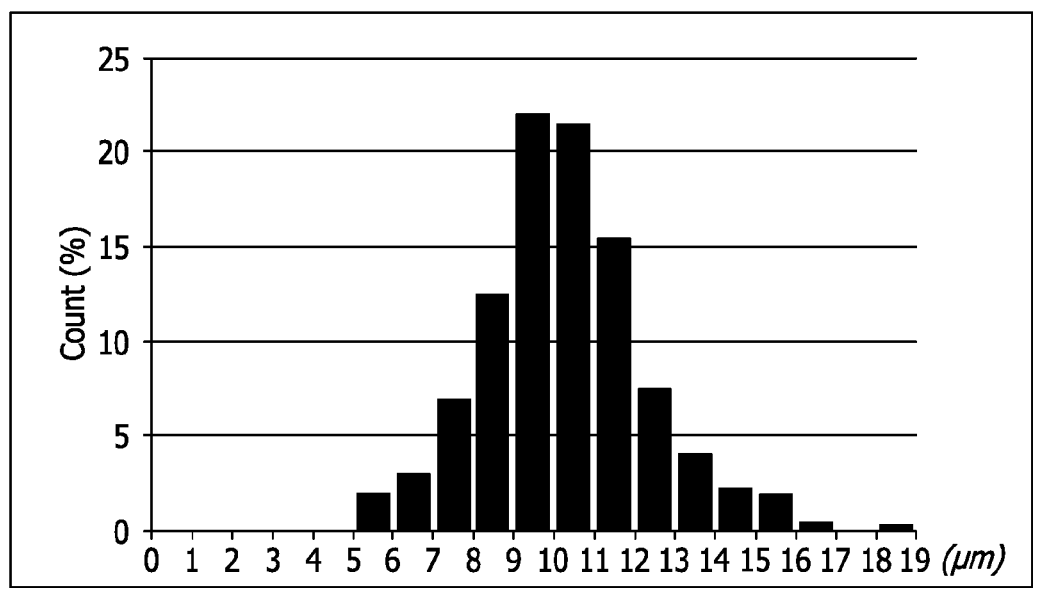
FIG. 17 is an example diamond grit size distribution.

FIG. 17 shows an example diamond size distribution. Each bin holds a percentage of diamond grits on a wire corresponding to a size of the diamond grit indicated on the x-axis. There are 14 bins, each with a uniform bin size of 1 μm. The diamond size distribution contains diamond grits larger than 5 μm and smaller than 19 μm.

Figure 18:
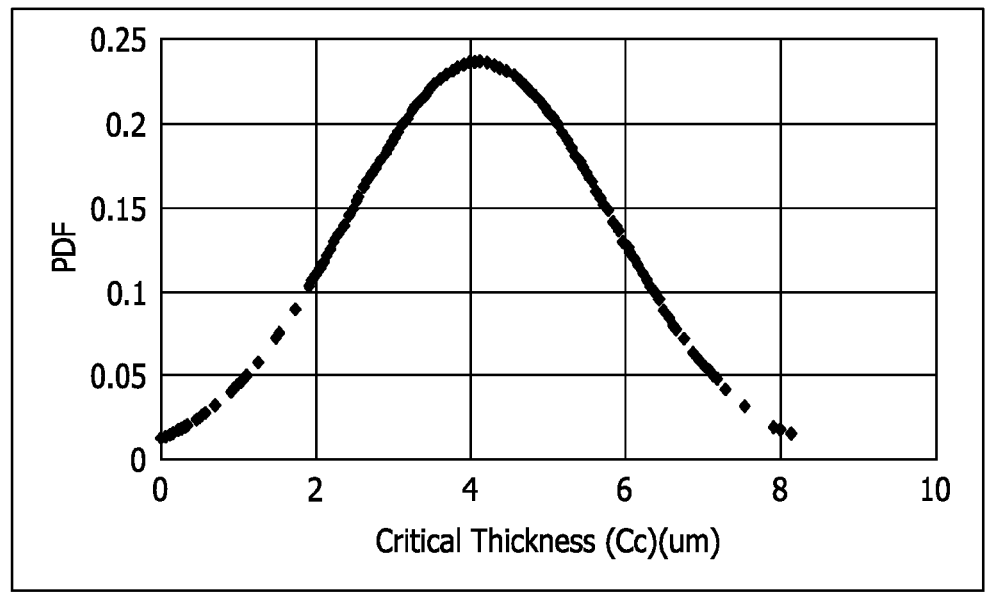
FIG. 18 is a plot of the probability density function of penetration thickness for the size distribution of FIG. 17.

FIG. 18 shows a penetration thickness probability distribution function (PDF) for the size range and size distribution of the wire shown in FIG. 17. The same concentration, wire core radius, table speed, and wire speed were used as in the previous examples. The maximum penetration thickness allowed is approximately 8 μm.

The following design requirements are given:
(1)—Maximum allowable penetration thickness less than or equal to 5 μm; and
(2)—Larger diamond size for this embodiment, with a maximum allowable size of less than or equal to 20 μm.

Incremental adjustment of the diamond size range is performed by removing the bins with the smaller number of diamonds at the two ends of the size distribution. One bin is removed at a time. After each bin removal, the methods described above with respect to Example 1 are used to compute a penetration thickness, until criterion (1) is satisfied, which sets the maximum allowable penetration thickness.

Figure 19:
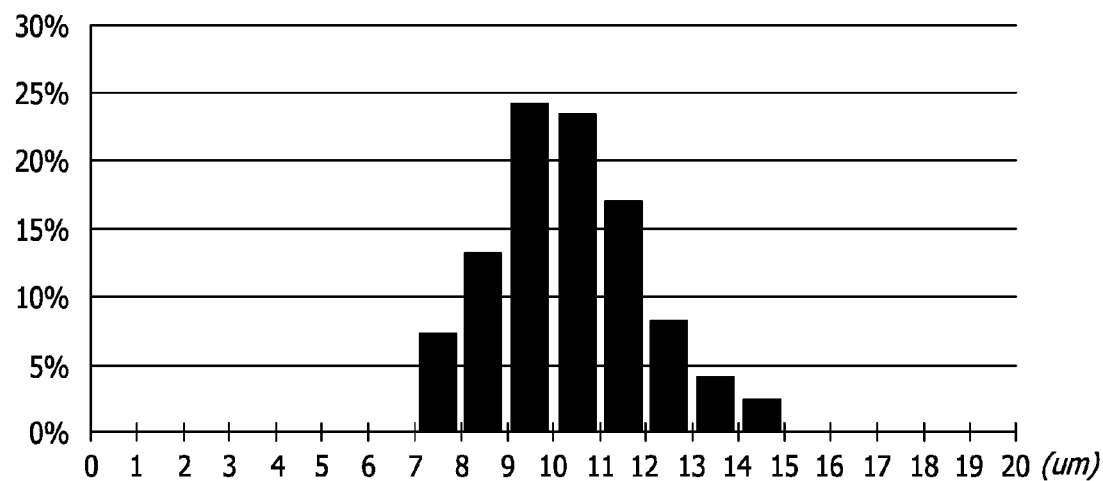
FIG. 19 is the example diamond grit size distribution of FIG. 17 with a modified diamond grit size range.

FIG. 19 shows a modified size range distribution, after incremental removal of six bins (4 bins from the upper end, and 2 bins from the lower end). Eight bins remain. The modified size range distribution contains diamond grits of larger than 5 μm and smaller than 15 μm.

Figure 20:
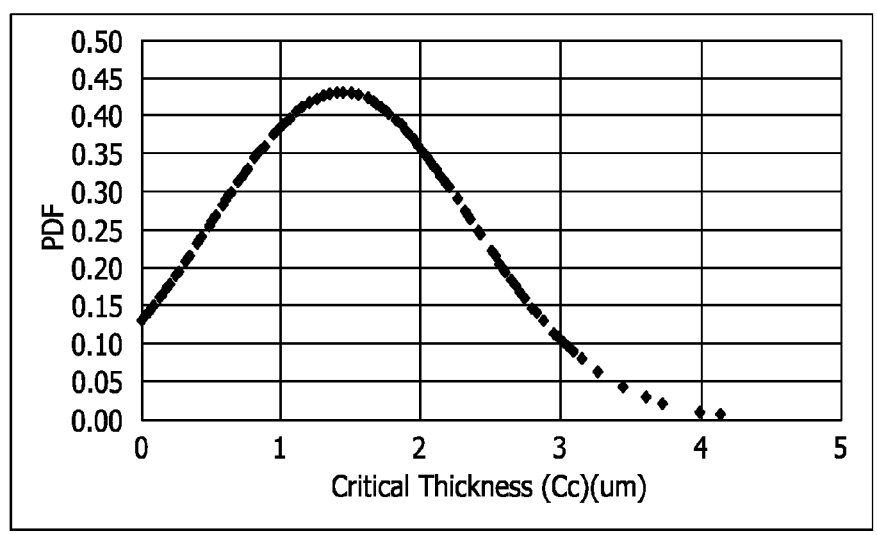
FIG. 20 is a plot of the probability density function of penetration thickness for the size distribution of FIG. 19.

FIG. 20 shows a PDF for the penetration thickness for the modified size range distribution shown in FIG. 19. The maximum penetration thickness is approximately 4.2 μm, which satisfies criterion (1) for the maximum allowable penetration thickness of 5 μm.

Figure 21:
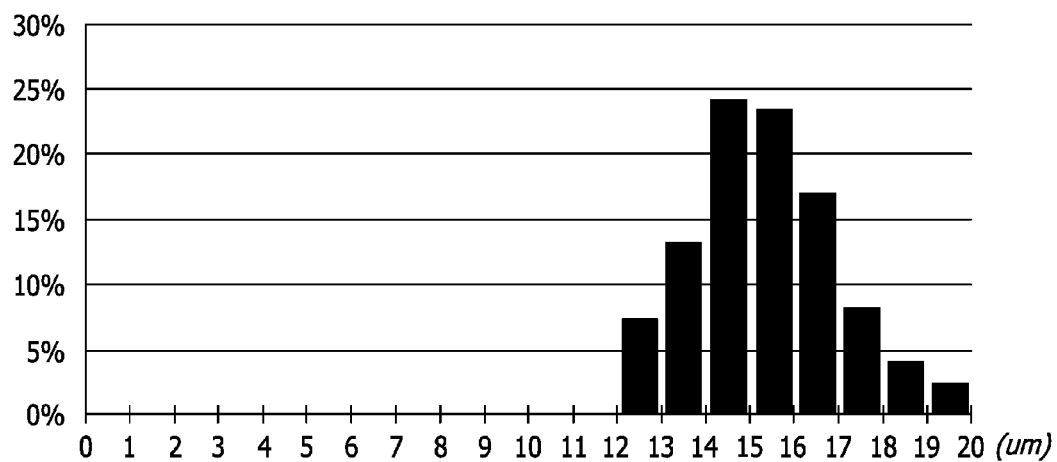
FIG. 21 is the example diamond size grit distribution of FIG. 19, shifted along the size axis to a threshold diamond grit size.

The modified size range is shifted along the size axis to the right, until the largest diamond size reaches 20 μm, to satisfy criterion (2). FIG. 21 shows the modified size range distribution over the shifted size range, from 12 μm to 20 μm.

Figure 22:
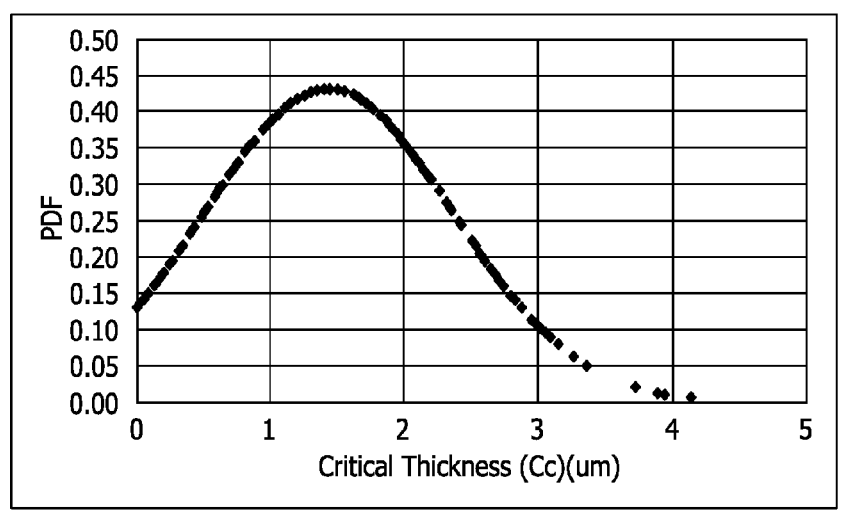
FIG. 22 is a plot of the probability density function of penetration thickness for the size distribution of FIG. 21.

FIG. 22 shows a PDF for the penetration thickness for the shifted size range distribution in FIG. 21. Notably, in conjunction with FIG. 20, this PDF confirms that a shift along the size axis does not alter the penetration thickness distribution. Therefore, for the given size distribution, the designed size range of approximately 8 μm, from 12 μm to 20 μm, satisfies both criteria for depth of subsurface damage (1) (for ideal wafer quality) and maximum diamond size (2) (which maximizes material removal rate and minimizes wire usage).

Optimizing the Size Dispersion of Diamond Grits

The methods described herein may further be used to determine an ideal diamond grit size dispersion (e.g., standard deviation) that takes into account given manufacturing parameters.

EXAMPLE 4

Figure 23:
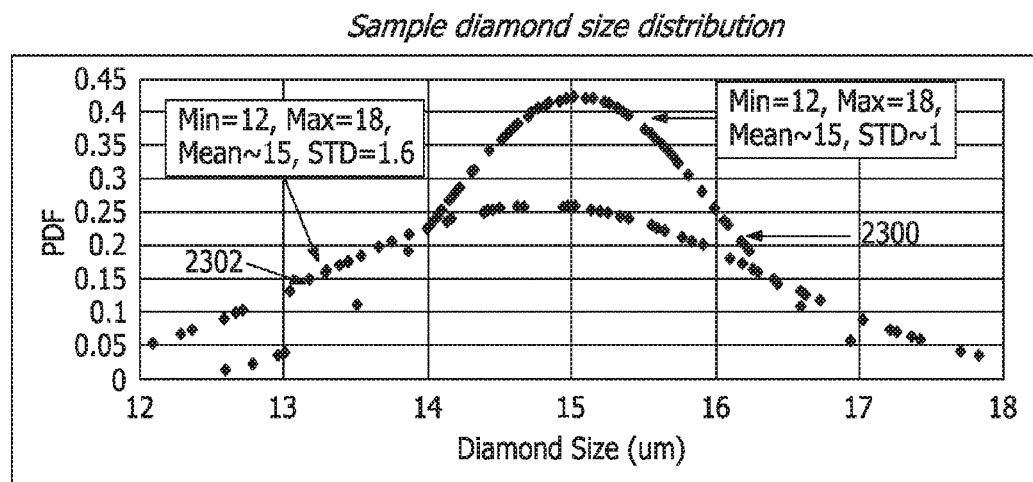
FIG. 23 is a plot of two example diamond grit size distributions with the same size ranges and different standard deviations.

FIG. 23 shows two diamond size distributions for two wires 2300 and 2302. First wire 2300 and second wire 2302 only differ in a standard deviation of their diamond size distributions. First wire 2300 has diamond grits with a size range of approximately 6 μm, from a minimum size of approximately 12 μm to a maximum size of approximately 18 μm; a mean size of approximately 15 μm; and a standard deviation of approximately 1 μm. Second wire 2302 has diamond grits with the same size range of 6 μm, also ranging from a minimum size of 12 μm to a maximum size of 18 μm; the same mean size of 15 μm; and a standard deviation of approximately 1.6 μm.

The given example parameters are the same as in previous examples: a wire core radius, r, of 50 μm; a table speed, $V_t$, of 13.3 μm/s; and a wire speed, $V_w$, of 18 m/s. For the given wire speed and table speed, for each meter that the wire travels, an ingot will move down approximately Δy=0.74 μm.

If the diamond concentration of both wires is such that at each Δy step there is only one diamond that can potentially cut the ingot, then for the given r and for Δy equal to 0.74 μm, there exist up to 67 cuts (50 μm/0.74 μm) that can potentially cut the ingot back before the ingot reaches the bottom location. Therefore, the number of input variables, N, is equal to 67. A penetration thickness ($C_c$) is computed for each of first wire 2300 and second wire 2302. In this example, the computation is repeated 500 times for each of first wire 2300 and second wire 2302.

Figure 24:
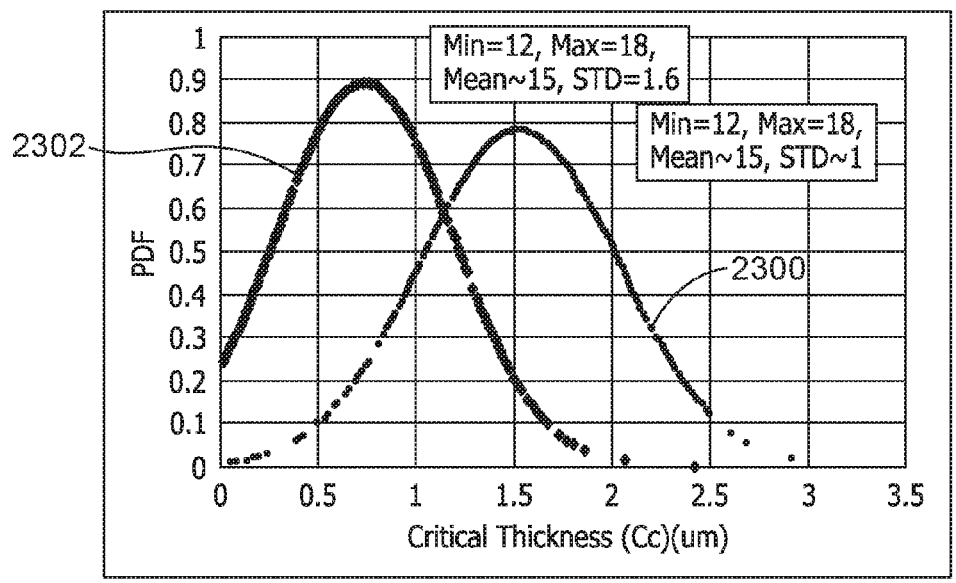
FIG. 24 is a plot of the probability density functions of penetration thickness for the size distributions of FIG. 23.

FIG. 24 shows probability density functions for the penetration thickness variables that are computed based on the 500 data points for each of first wire 2300 and second wire 2302. For first wire 2300, with the diamond size distribution with the standard deviation of 1 μm, the maximum penetration thickness is approximately 2.9 μm, with an average penetration thickness of approximately 1.5 μm. For second wire 2302, with the diamond size distribution with the standard deviation of 1.6 μm, the maximum penetration thickness is approximately 2.4 μm, with an average penetration thickness of approximately 0.8 μm. The maximum penetration thickness, which is a measure for depth of subsurface damage, is 0.5 μm smaller in second wire 2302. This result indicates that for a fixed size range, choosing diamond grits with a larger size dispersion, as measured by the standard deviation, reduces the maximum penetration thickness.

Figure 25:
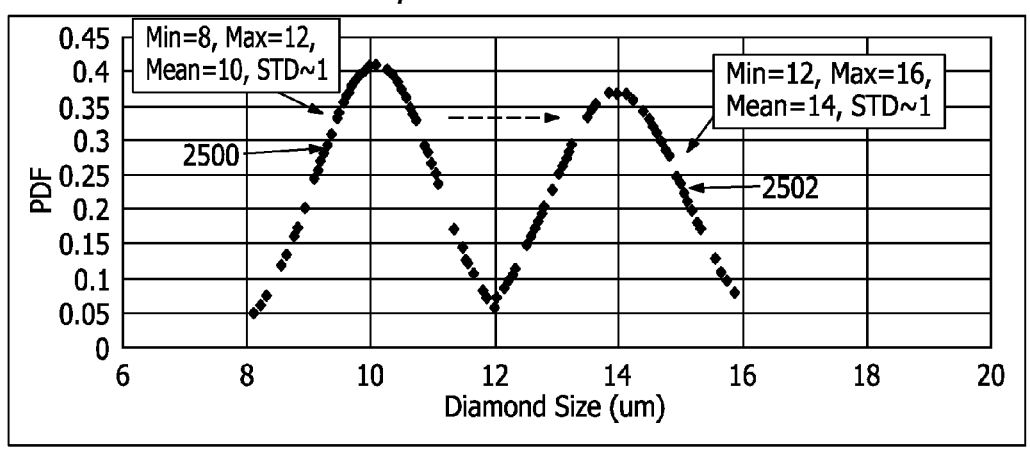
FIG. 25 is a plot of two example diamond grit size distributions with the same size range, the same standard deviation, and different mean size.

FIG. 25 shows diamond size distributions of two wires 2500 and 2502 having the same standard deviation. First wire 2500 has diamond grits with a size range of approximately 4 μm, from a minimum size of approximately 8 μm to a maximum size of approximately 12 μm; a mean size of approximately 10 μm; and a standard deviation of approximately 1 μm. Second wire 2502 has diamond grits with the same size range of 4 μm, as for first wire 2500, but ranging from a minimum size of approximately 12 μm to a maximum size of approximately 16 μm; a mean size of approximately 14 μm; and a standard deviation of approximately 1 μm. The diamond size distributions for first wire 2500 and second wire 2502 have the same shape, and only differ on that the distribution for second wire 2502 is shifted along the size axis relative to the distribution for first wire 2500. Using the same diamond concentration, wire speed, table speed, and number of iterations as in previous examples, the same method may be used to determine a penetration thickness.

Figure 26:
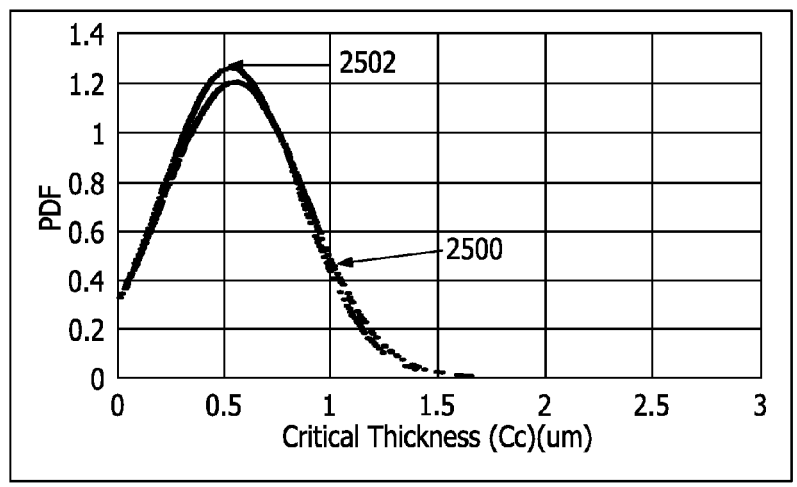
FIG. 26 is a plot of the probability density functions of penetration thickness for the size distributions of FIG. 25.

FIG. 26 shows a probability distribution function (PDF) for penetration thickness for each of first wire 2500 and second wire 2502. The two distributions only differ slightly. The shift of diamond size along the size axis, keeping dispersion (standard deviation) the same, has almost no effect on the penetration thickness PDF. Therefore, there is almost no effect on depth of subsurface cracks.

In other words, the mean size of the diamond grits has much less of an effect on the depth of subsurface damage than does the size dispersion of the diamond grits. Thus, a wire may be designed to have larger diamond grits while maintaining a predetermined maximum penetration thickness. The larger diamond grit size enables increased material removal rate in the top segment of a cutting zone (i.e., top segment 602, shown in FIG. 6). As described above, choosing larger diamond grits reduces required wire usage. Moreover, choosing a particular size dispersion and a particular size range enables maintenance of the required penetration thickness (depth of subsurface damage) in the left and right segments (i.e., left and right segments 604, 606, shown in FIG. 6). As described above, reducing penetration thickness improves wafer quality. In other words, the manufacturing of a DCW with an increased size dispersion of diamond grits and an increased mean size of diamond grits enables the coordination of two competing concerns of DCW manufacturing—wire usage and wafer quality.

EXAMPLE 5

Example 5 illustrates designing and manufacturing DCWs by adjusting size dispersion (standard deviation) of diamond grits, when the size range and the concentration are held fixed. More specifically, in practice, the method for determining a diamond grit size dispersion for an improved DCW may include the following steps:
(i) Requirements for depth of subsurface cracks are defined (e.g., by manufacturing requirements/parameters). These requirements may include the maximum allowed subsurface crack depth, the average subsurface crack depth, or any other measure.
(ii) Corresponding maximum allowable penetration thickness values are calculated.
(iii) A requirement for material removal is defined, which sets a maximum diamond grit size. The maximum diamond grit size may further be defined by the concentration of diamond grit, such that the diamonds do not stack up on each other on the wire.
(iv) For a given diamond size distribution over a given size range, the size dispersion (standard deviation) is incrementally adjusted toward a flatter distribution, while the area under the curve is kept constant. At each increment, the penetration thickness is computed by using the methods described above (e.g., in FIGS.

11-13 and in Example 1). The computed penetration thickness is compared to the target penetration thickness, determined in (ii). The incremental adjustment of the size dispersion (standard deviation) continues until the maximum allowable penetration thickness is reached.

(v) Once the target size dispersion is determined in (iv), the size distribution is shifted to the defined maximum diamond size, based on the criteria defined in (iii).

Figure 27:
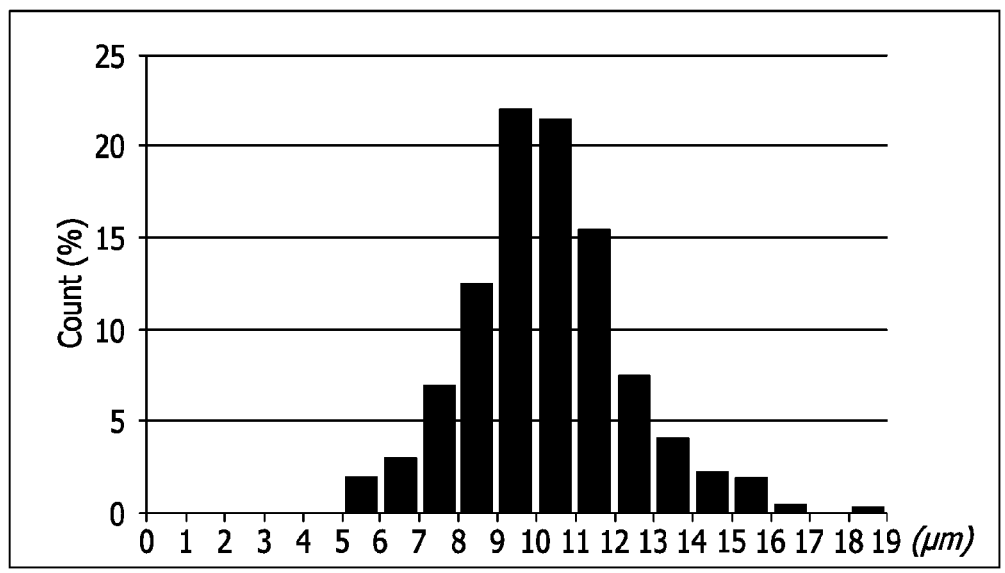
FIG. 27 is an example diamond grit size distribution.

FIG. 27 shows an example diamond size distribution. Each bin holds a percentage of diamond grits on a wire corresponding to a size of the diamond grit indicated on the x-axis. There are 14 bins, each with a uniform bin size of 1 μm. The diamond size distribution contains diamond grits larger than 5 μm and smaller than 19 μm.

Figure 28:
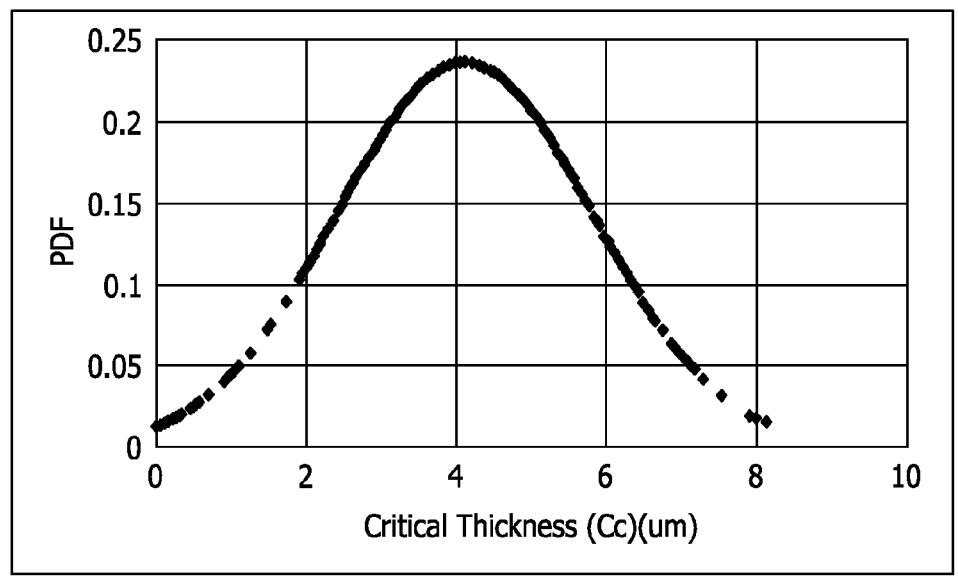
FIG. 28 is a plot of the probability density function of penetration thickness for the size distribution of FIG. 27.

FIG. 28 shows a penetration thickness probability distribution function (PDF) for the size range and size distribution of the wire shown in FIG. 27. The same concentration, wire core radius, table speed, and wire speed were used as in the previous examples. The maximum penetration thickness is approximately 8 μm.

The following design requirements are given:
(1)—Maximum allowable penetration thickness less than or equal to 5 μm; and
(2)—Larger diamond size for this embodiment, with a maximum allowable size of less than or equal to 23 μm.

The diamond grit size dispersion is incrementally increased by reducing the height of a particular bin with the highest peak to the height of a bin with the next-highest peak. In other words, diamond grits having a size corresponding to the bin with the highest peak are removed, to lower the peak of that bin to the height of the bin with the next-highest peak. The total reduction in diamond grits from the bin with the highest peak (i.e., the number of diamond grits removed from the bin with the highest peak) is added to a bin with the lowest peak. In other words, more diamond grits are added to the bin corresponding to the lowest peak. Thereby, the area under the curve (the total number of diamond grits) is kept constant. After each increment, the method described above is used to compute a penetration thickness for the modified distribution. The increasing of size dispersion (standard deviation) continues until the penetration thickness criterion (1) is satisfied.

Figure 29:
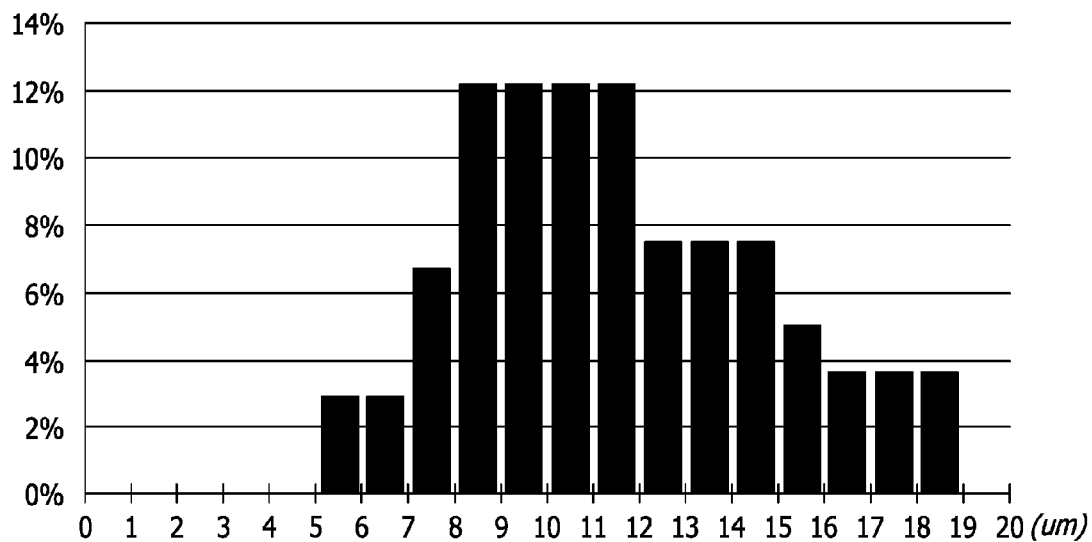
FIG. 29 is the example diamond grit size distribution of FIG. 27 with a modified diamond grit size standard deviation.

FIG. 29 shows a modified distribution with a standard deviation of 3.2 μm. (The original distribution, shown in FIG. 27, had a standard deviation of 2.1 μm.)

Figure 30:
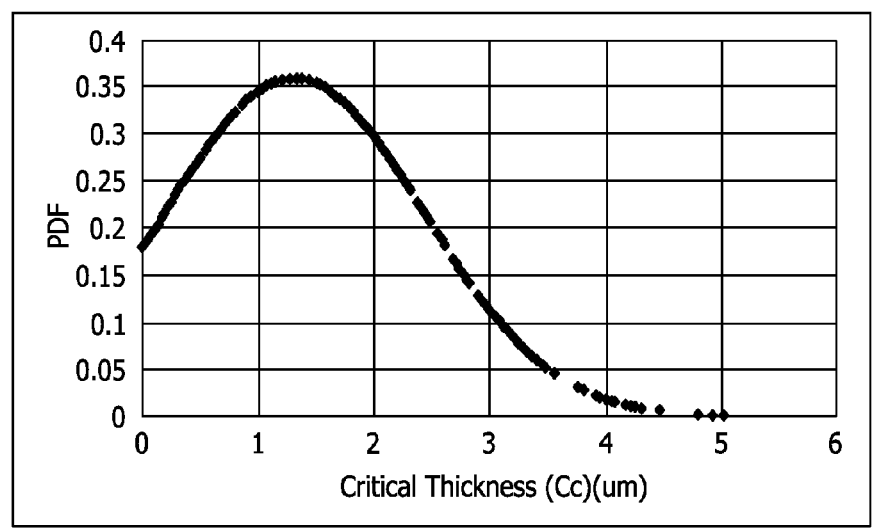
FIG. 30 is a plot of the probability density function of penetration thickness for the size distribution of FIG. 29.

FIG. 30 shows a probability density function (PDF) for the penetration thickness of the distribution in FIG. 29. The maximum penetration thickness is approximately 5 μm, which satisfies the criterion (1) for the maximum allowable penetration thickness of less than or equal to 5 μm.

Figure 31:
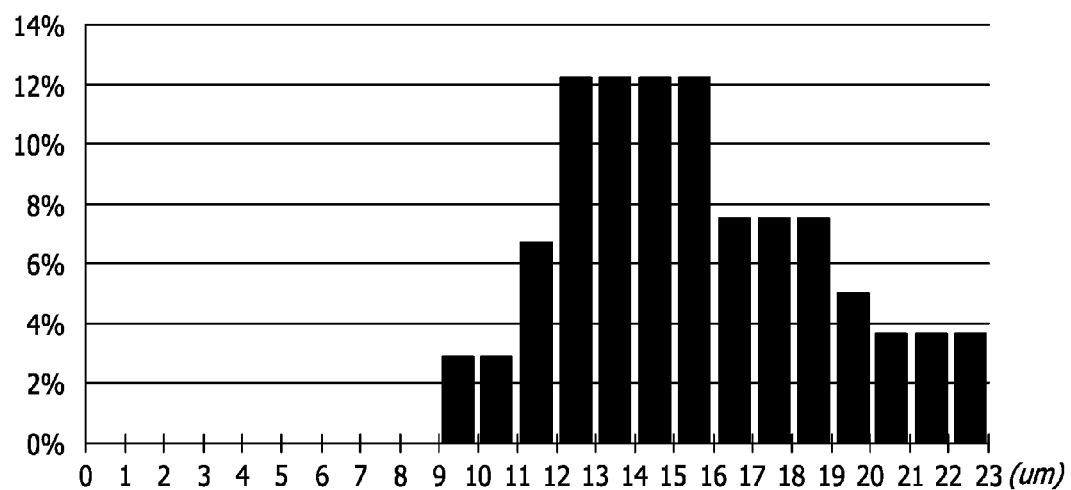
FIG. 31 is the example diamond size grit distribution of FIG. 29, shifted along the size axis to a threshold diamond grit size.

The modified size range may now be shifted along the size axis to the right until the largest size is just smaller than 23 μm, according to criterion (2). FIG. 31 shows the modified size distribution over the shifted size range, which is from 9 μm to 22 μm.

Figure 32:
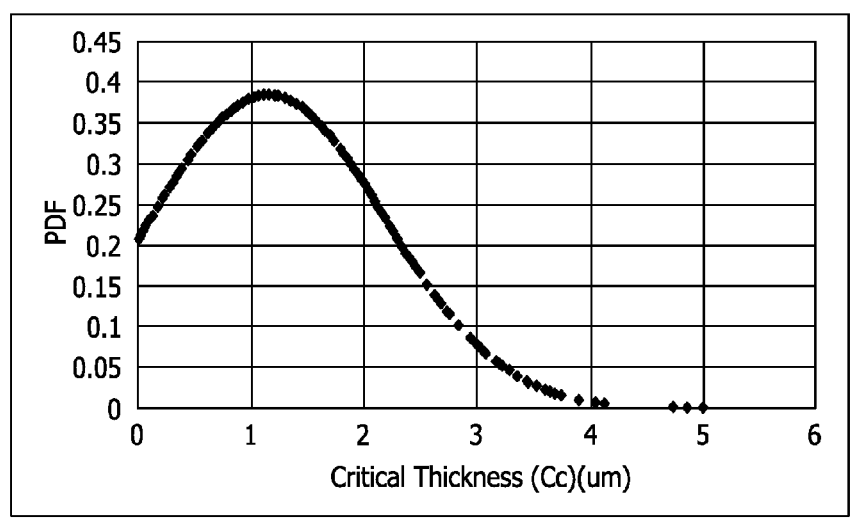
FIG. 32 is a plot of the probability density function of penetration thickness for the size distribution of FIG. 31.

FIG. 32 shows a probability density function (PDF) for the penetration thickness of the modified distribution shown in FIG. 31. Notably, in conjunction with FIG. 30, this PDF confirms that a shift of the size distribution along the size axis, keeping the size dispersion fixed, does not alter the penetration thickness distribution. Therefore, for a given size range and diamond concentration, the designed diamond size distribution with increased dispersion satisfies both criteria for depth of subsurface damage (1) (for ideal wafer quality) and maximum diamond size (2) (which maximizes material removal rate and minimizes wire usage).

Embodiments of the methods and systems described herein achieve superior results compared to prior methods and systems. For example, unlike at least some known wafer-slicing methods, the methods described herein facilitate the optimization of the diamond coated wire by reconciling the two opposing factors in manufacturing processes (i.e., producing wafers with low subsurface damage, and producing wafers while minimizing the amount of wire consumed). Specifically, the embodiments described herein facilitate reducing subsurface damage and reducing wire consumption simultaneously. Some embodiments use a methodology for selecting a range for a size of diamond grits used to manufacture a diamond coated wire such that wire usage and depth of subsurface damage can both be controlled. Further, the methodology enables improved control of flatness, roughness, and surface topography over the entire lifetime of the wire. Further, embodiments described herein facilitate accurately modeling scenarios where a large number of indenters of different sizes are involved and where material removal rates and depth of damage requirements are different at different locations. Moreover, variation of depth of damage across the entire surface area of a substrate may be more controlled, in comparison to prior methods and systems.

Additional benefits include better control of flatness, roughness, and surface topography during the lifetime of a diamond coated wire designed according to the embodiments described herein. For example, surface roughness, as measured by total thickness variation (TTV), may be improved using the embodiments described herein. In general, the embodiments described herein facilitate the optimization of a diamond coated wire for wafer-slicing systems.

When introducing elements of the present disclosure or the embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above without departing from the scope of the disclosure, it is intended that all matter contained in the above description and shown in the accompanying drawings shall be interpreted as illustrative and not in a limiting sense.

What is claimed is:

1. A method for designing a diamond coated wire for use in a wafer slicing system, the method comprising:
adjusting an initial diamond size distribution until an intermediate diamond size distribution is generated, wherein the intermediate diamond size distribution has a corresponding simulated penetration thickness value less than or equal a predetermined penetration thickness value, and wherein penetration thickness is a parameter proportional to a depth of subsurface damage that would occur when slicing an ingot using a diamond coated wire having an associated diamond size distribution;
adjusting the intermediate diamond size distribution until a final diamond size distribution is generated, wherein the final diamond size distribution has a maximum diamond grit size that is substantially equal to a predetermined maximum diamond grit size; and manufacturing the diamond coated wire such that the diamond coated wire has a plurality of diamond grits that fit the final diamond size distribution.

2. The method of claim 1, wherein adjusting an initial diamond size distribution comprises adjusting a diamond size range of the initial diamond size distribution.

3. The method of claim 2, wherein adjusting a diamond size range comprises reducing the diamond size range of the initial diamond size distribution.

4. The method of claim 2, wherein reducing the diamond size range comprises reducing the diamond size range to approximately 8 microns.

5. The method of claim 1, wherein adjusting an initial diamond size distribution comprises adjusting a standard deviation of the initial diamond size distribution.

6. The method of claim 5, wherein adjusting a standard deviation comprises increasing the standard deviation of the initial diamond size distribution.

7. The method of claim 1, wherein adjusting an initial diamond size distribution comprises maintaining an average diamond size of the initial diamond size distribution.

8. The method of claim 1, wherein the predetermined penetration thickness value is approximately 5 microns.

9. The method of claim 1, wherein adjusting the intermediate diamond size distribution comprises adjusting an average diamond size of the intermediate diamond size distribution.

10. The method of claim 9, wherein adjusting an average diamond size of the intermediate diamond size distribution comprises increasing the average diamond size of the intermediate diamond size distribution.

11. The method of claim 1, wherein the predetermined maximum diamond grit size is between approximately 20 microns and 23 microns.

12. The method of claim 1, wherein the simulated penetration thickness value is an average penetration thickness value.

13. The method of claim 1, wherein the simulated penetration thickness value is a maximum penetration thickness value.

14. The method of claim 1, wherein penetration thickness is defined as a thickness of ingot material that a diamond grit oriented substantially orthogonal to a resulting wafer surface would need to cut through to reach the resulting wafer surface.

15. The method of claim 1, wherein adjusting an initial diamond size distribution comprises:
reducing a diamond size range of the initial diamond size distribution; and
increasing a standard deviation of the initial diamond size distribution.

16. A diamond coated wire for use in a wafer slicing system, the diamond coated wire comprising a plurality of diamond grits fitting a predetermined diamond size distribution, wherein the predetermined diamond size distribution has a simulated penetration thickness value less than or equal to approximately 5 microns, wherein penetration thickness is a parameter proportional to a depth of subsurface damage that would occur when slicing an ingot using the diamond coated wire, and wherein the predetermined diamond size distribution has a maximum diamond grit size between approximately 20 microns and 23 microns.

17. The diamond coated wire of claim 16, wherein the predetermined diamond size distribution has a diamond size range less than or equal to approximately 8 microns.

18. The diamond coated wire of claim 16, wherein the predetermined diamond size distribution has a diamond size range that extends from approximately 12 microns to 20 microns.

19. The diamond coated wire of claim 16, wherein the predetermined diamond size distribution has a standard deviation greater than or equal to approximately 1.6 microns.

20. The diamond coated wire of claim 16, wherein the predetermined diamond size distribution has a standard deviation greater than or equal to approximately 3.2 microns.

* * * * *